United States Patent
Müller et al.

(10) Patent No.: US 12,515,401 B2
(45) Date of Patent: Jan. 6, 2026

(54) MELT ELECTRO-WRITING SYSTEM AND CORRESPONDING METHOD

(71) Applicant: TECHNISCHE UNIVERSITÄT MÜNCHEN, Munich (DE)

(72) Inventors: Kilian Müller, Munich (DE); Sarah Burkhardt, Munich (DE); Petra Mela, Garching bei München (DE); Stefan Leonhardt, Munich (DE); Sebastian Tobias Pammer, Munich (DE); Johannes Schweiger, Kolsass (AT)

(73) Assignee: TECHNISCHE UNIVERSITÄT MÜNCHEN, Munich (DE)

( * ) Notice: Subject to any disclaimer, the term of this patent is extended or adjusted under 35 U.S.C. 154(b) by 143 days.

(21) Appl. No.: 18/256,287

(22) PCT Filed: Dec. 7, 2021

(86) PCT No.: PCT/EP2021/084607
§ 371 (c)(1),
(2) Date: Jun. 7, 2023

(87) PCT Pub. No.: WO2022/122734
PCT Pub. Date: Jun. 16, 2022

(65) Prior Publication Data
US 2024/0100771 A1    Mar. 28, 2024

(30) Foreign Application Priority Data
Dec. 10, 2020  (EP) ..................................... 20213149

(51) Int. Cl.
*B33Y 10/00*   (2015.01)
*B29C 64/118*  (2017.01)
(Continued)

(52) U.S. Cl.
CPC .......... *B29C 64/209* (2017.08); *B29C 64/118* (2017.08); *B29C 64/295* (2017.08); *B33Y 10/00* (2014.12); *B33Y 30/00* (2014.12)

(58) Field of Classification Search
CPC ...... D01D 5/0069; B33Y 30/00; B33Y 10/00; B29C 64/295
See application file for complete search history.

(56) References Cited

U.S. PATENT DOCUMENTS

2016/0114516 A1* 4/2016 Joo .......................... D01D 5/24
                                                          428/401
2016/0168755 A1* 6/2016 Toyoda ................ D01D 5/0092
                                                          425/72.2
(Continued)

FOREIGN PATENT DOCUMENTS

CN    103225116 A    7/2013
CN    105133054 A    12/2015
(Continued)

OTHER PUBLICATIONS https://www.curbellplastics.com/materials/applications/good-electrical-insulation/?srsltid=AfmBOor3WWc1QZD0XVzR1vsxQpjJaS9KykVKI7Akv23LD7H89fJEmeck (Year: 2025).*

(Continued)

*Primary Examiner* — Alison L Hindenlang
*Assistant Examiner* — Debjani Roy
(74) *Attorney, Agent, or Firm* — Grossman, Tucker, Perreault & Pfleger, PLLC

(57) ABSTRACT

A system for electro-writing of a polymer melt comprises a print-head and a feed mechanism configured to controllably feed solid polymer base material towards the print-head, wherein the print-head comprises a nozzle, a heater and an insulating spacer, wherein the print-head is configured to eject the polymer melt via the nozzle, wherein the nozzle is configured to be held at a selectable electric potential, (Continued)

wherein the heater is arranged in the print-head and proximate the nozzle, wherein the heater is configured to heat the solid polymer base material beyond its melting point to create the polymer melt in the print-head, wherein insulating spacer is arranged between the heater and the nozzle, wherein the insulating spacer electrically insulates the heater and the nozzle, and wherein the insulating spacer is at least partially surrounded by the heater.

17 Claims, 8 Drawing Sheets

(51) Int. Cl.
  *B29C 64/209* (2017.01)
  *B29C 64/295* (2017.01)
  *B33Y 30/00* (2015.01)

(56) References Cited

U.S. PATENT DOCUMENTS

| 2018/0043612 A1* | 2/2018 | Gray | B33Y 30/00 |
| 2020/0324478 A1* | 10/2020 | MacNeish, III | H05B 3/12 |
| 2021/0230773 A1* | 7/2021 | Wang | D01D 4/02 |

FOREIGN PATENT DOCUMENTS

| CN | 106535780 | * | 2/2017 |
| CN | 106435780 | * | 9/2018 |
| CN | 108501371 A | | 9/2018 |
| EP | 3444387 A1 | | 2/2019 |
| KR | 20080099366 | * | 11/2008 |

OTHER PUBLICATIONS

Morgan Advanced Materials: https://www.morgantechnicalceramics.com/en-gb/ceramics-101/thermal-properties-of-ceramics/thermal-conductivity/ (Year: 2024).*
M.F. Arif et al., Performance of biocompatible PEEK processed by fused deposition additive manufacturing, Materials and Design, 2018, pp. 249-259.
Toby D. Brown et al., Direct Writing By Way of Melt Electrospinning, Advanced Materials, 2011, pp. 5651-5657, vol. 23, Wiley-Vch Verlag GmbH & Co. KHaA, Weinheim.
Paul D. Dalton et al., Electrospinning and additive manufacturing: converging technologies, Biomaterials Science—The Royal Society of Chemistry, 2013, 14 pages.
Gernot Hochleitner et al., High definition fibrous poly(2-ethyl-2-oxazoline) scaffolds through melt electrospinning writing, Polymer communication, 2014, p. 5017-5023, Elsevier Ltd.
Gernot Hochleitner et al., Additive manufacturing of scaffolds with sub-micron filaments via melt electrospinning writing, Biofabrication, 2015, vol. 7, IOP Publishing Ltd.
Andrei Hrynevich et al., Dimension-Based Design of Melt Electrowritten Scaffolds, Advanced Science News, 2018, vol. 14, issue 1800232, Wiley-Vch Verlag GmbH & Co. KHaA, Weinheim.
International Search Report and Written Opinion of International Application No. PCT/EP2021/084607, mail date Mar. 22, 2022, 20 pages.
Ali Kilic et al., Effects of Polarity on Electrospinning Process, Textile Research Journal, 2008, vol. 78(6), Sage Publications, Los Angeles, London, New Delhi and Singapore, pp. 532-539.
Qiu Li Loh et al., Three-Dimensional Scaffolds for Tissue Engineering Applications: Role of Porosity and Pore Size, Tissue Engineering: Part B, vol. 19, No. 6, 2013, Division of Materials Technology, School of Materials Science and Engineering, Nanyang Technological University, Singapore, pp. 485-502.
Erin Mccoll et al., Design and Fabrication of Melt Electrowritten Tubes using Intuitive Software, Materials and Design, vol. 155, 2018, pp. 46-58, Elsevier Ltd.
Nikola Ristovski et al., Improved Fabrication of Melt Electrospun Tissue Engineering Scaffolds using Direct Writing and Advanced Electric Field Control, Biointer phases, vol. 10, No. 1, Mar. 2015, American Vacuum Society, pp. 011006-1-011006-10.
Michael L. Rivera et al., Desktop Electrospinning a Single Extruder 3D Printer for Producing Rigid Plastic and Electrospun Textiles, 2019, pp. 1-12.
Thomas M. Robinson et al., The Next Frontier in Melt Electrospinning: Taming the Jet, Advanced Functional Materials Journal, vol. 29, 2019, Wiley-Vch Verlag GmbH & Co. KHaA, Weinheim, pp. 1-28.
Navid T. Saidy et al., Biologically Inspired Scaffolds for Heart Valve Tissue Engineering via Melt Electrowriting, Advanced Science News, vol. 15, 2019, Wiley-Vch Verlag GmbH & Co. KHaA, Weinheim, pp. 1-15.
A.F. Spivak et al., Asymptotic Decay of Radius of a Weakly Conductive Viscous Jet in an External Electric Field, Applied Physics Letters, vol. 73, No. 21, Nov. 23, 1998, AIP Publishing, pp. 3067-3069.
Geoffrey Taylor, Electrically Driven Jets, Proceedings of the Royal Society of London. Series A, Mathematical and Physical Sciences, vol. 313, No. 1515, Dec. 2, 1969, Published by Royal Society, pp. 453-475.
FM Wunner et al., Electrospinning With Polymer Melts—State of the Art and Future Perspectives, Comprehensive Biomaterials II, vol. 5, Elsevier Ltd. pp. 217-235.
Felix M. Wunner et al., Electrospinning Writing with Molten Poly (E-Caprolactone) from Different Directions—Examining the Effects of Gravity, Materials Letters, vol. 216, 2018, Elsevier Ltd., pp. 114-118.
Felix M. Wunner et al., Melt Electrospinning Writing of Highly Ordered Large Volume Scaffold Architectures, Advanced Materials, vol. 30, 2018, Wiley-Vch Verlag GmbH & Co. KHaA, Weinheim, pp. 1-6.
Almoatazbellah Youssef et al., The Impact of Melt Electrowritten Scaffold Design on Porosity Determined by X-Ray Microtomography, Tissue Engineering & Regenerative Medicine International Society: Part C, vol. 25, No. 6, 2019, Mary Ann Liebert, Inc., Germany, pp. 367-378.

* cited by examiner

MELT ELECTRO-WRITING SYSTEM AND CORRESPONDING METHOD

FIELD OF THE INVENTION

The present invention is in the field of additive manufacturing. More precisely, the present invention relates to Electro-Writing of polymer structures in a continuous writing mode.

BACKGROUND

Additive manufacturing relies on the sequential deposition of a build material to gradually build a complete part from sequentially deposited material layers based on a virtual copy of the intended structure. Usually, a relative movement between a print-head and a build plate is driven to define the geometry of one material layer in a two-dimensional plane. When subsequent layers are deposited on top of the previously deposited layers, a three-dimensional structure can be progressively constructed.

Electro-writing is a technique in which a flow of a polymer material from an emitter towards a collector is stabilized via an electric field. For example, a polymer may be provided in molten form by a conductive nozzle and may be directed from the nozzle onto a conductive collector plate by a high-voltage electric field, in a technique called Melt-Electro(spinning)-Writing. The electric field may charge the polymer material and pull the polymer material into streams with a thickness that is smaller than the nozzle diameter while the charged polymer material is attracted by the collector.

The polymer stream may bridge the gap between the emitter and the collector while cooling, such that a solid or solidifying polymer material is deposited on the collector. By controlling the voltage, the distance between the emitter and the collector and the flow rate of the polymer material at the emitter, the polymer material may be deposited at a pre-defined position on the collector, or may be spun into thin fibers deposited semi-randomly in a deposition region of the collector. Three-dimensional shapes of the polymer material may then be generated by sequentially depositing multiple layers of the polymer material.

For Melt Electro-Spinning Writing, the initially solid polymer base material is conventionally provided in a syringe type reservoir and melted to obtain a viscous polymer melt in the syringe reservoir. Said polymer melt is then discharged via a nozzle, also called spinneret, towards the substrate by actuating a syringe piston or via an applied air pressure.

EP 3 444 387 A1 discloses a Melt Electrospinning system with a housing connected to a conductive spinneret. Raw resin is loaded into a hopper and transported towards the housing via a screw. To avoid arcing between the housing and the conductive spinneret, a high-voltage is applied to an external charging electrode to charge the spinneret via electrostatic induction. An air-stream then blows fibers spun from the spinneret onto a collecting sheet on a transport conveyor.

M. L. Rivera and S. E. Hudson ("*Desktop Electrospinning: A Single Extruder 3D Printer for Producing Rigid Plastic and Electrospun Textiles*" in: *Proc. 2019 CHI Conf. Hum. Factors Comput. Syst.*, 2019) disclose a 3D printer that combines rigid plastic printing with melt electrospinning. A PLA filament is guided towards a print-head with a spinneret and a heater, with the heater melting the PLA filament and the spinneret discharging the polymer melt. In the Melt Electrospinning-mode, the spinneret is (electrically) grounded while a high voltage is applied to the conductive build plate, such that the polymer melt is electrospun onto the build plate in a randomized deposition mode to form polymer felt swatches on the build plate or on 3D-printed structures.

CN 105 133 054 A discloses an electrostatic spinning device comprising a centrifugal disc-shaped nozzle mounted on a motor. In use, the disc-shaped nozzle is grounded and spins above a cone-shaped collecting plate, which is connected to a high-voltage electrostatic generator. A heat insulating ring is attached to a bearing to prevent overheating of the bearing.

CN 103 225 116 A discloses a differential electrostatic nozzle, which can realize the function of a single nozzle to produce multiple fibers through the split flow of the inner cone of the nozzle. The nozzle is grounded, while a receiving electrode plate is held at an elevated potential. A heating device directly contacts an inner cone nozzle to control its temperature, while the air inlet pipe provides hot gas from an external hot gas source to generate spun fibers in the inner cone nozzle.

CN 108 501 371 A discloses a high-temperature nozzle of a biological 3D printer. The needle is coupled to a barrel heat conducting sleeve with a needle heat conducting sleeve to allow for even heating of barrel and needle. A needle heat insulating sleeve and a heat insulating housing are arranged on the outside of the printhead to prevent heat leakage from the printhead.

SUMMARY OF THE INVENTION

The conventional techniques and systems based on syringe type fiber extrusion lead to an intrinsically cyclic mode of operation, with the polymer melt reservoir requiring a refill after a pre-determined printing period. In addition, extended resin/polymer melt reservoirs can lead to degradation of base material, e.g. in the case of bio-degradable polymer base materials for manufacturing custom devices for bio-medical applications.

On the other hand, prior attempts to continuously produce electro-spun fibers have been limited to randomly ordered polymer fibers in a random deposition area.

In view of this state-of-the-art, the object of the invention is to provide an improved system for the controlled electrowriting of polymer structures which also enables continuous operation with solid polymer base material.

This object is solved by a system for and method of electro-writing according to the independent claims. The dependent claims relate to preferred embodiments.

According to a first aspect, the invention relates to a system for electro-writing of a polymer melt, the system comprising a print-head and a feed mechanism configured to controllably feed solid polymer base material towards the print-head, wherein the print-head comprises a nozzle, a heater and an insulating spacer. The print-head is configured to eject the polymer melt via the nozzle, wherein the nozzle is configured to be held at a selectable electric potential. The heater is arranged in the print-head and proximate the nozzle, and the heater is configured to heat the solid polymer base material beyond its melting point to create the polymer melt in the print-head. The insulating spacer is arranged between the heater and the nozzle, wherein the insulating spacer electrically insulates the heater and the nozzle, and wherein the insulating spacer is at least partially surrounded by the heater.

The inventors found that the drawbacks of the prior art could be overcome by charging the nozzle for improving a directionality of the polymer deposition while at the same time improving an electrical insulation between the heater and the nozzle by the insulating spacer. With the insulating spacer arranged between the nozzle and the heater, arcing between the heater and the nozzle can be prevented. Further, since the insulating spacer protrudes into the heater, the polymer melt may be at least partially heated through the insulating spacer, thereby at least partially obviating a need to contact the polymer melt with electrically conductive portions of the heater. Hence, electrical current flow from the nozzle to the heater through the polymer melt may be avoided. The inventors found that the fluid path of polymer melt between the heater and the nozzle may be associated with Ohmic losses, which can be at least reduced with the insulating spacer protruding into the heater and increasing a distance between conductive portions of the nozzle and the heater.

As a result, the system may be operated with continuously fed solid polymer base material locally heated in the print-head while enabling deterministic deposition of polymer fibers with substantially pre-determined orientation and/or pre-determined deposition location in an electro-writing mode.

In operation, the print-head may be mounted to face a conductive collector and a voltage may be applied between the collector and the nozzle, wherein the voltage and the feed rate of the polymer are suitable for controlling a flow of the polymer melt from the print-head towards the collector.

In preferred embodiments, the system comprises a voltage source configured to apply an electric potential to the nozzle.

The voltage source may apply electric potentials of opposite polarities to the nozzle and the collector or may apply a selectable electric potential to the nozzle while the collector is (electrically) grounded, wherein the selectable electric potential and the feed rate of the polymer should be suitable for controlling a flow of polymer melt from the print-head towards the collector. The electric potential may be applied to the nozzle via a conductor connecting to a metallic portion of the nozzle.

The electrical potential may be selected such that a stable fluid column is formed between the nozzle and the collector, wherein a flow of the polymer melt may be substantially along the electric field lines between the nozzle and the collector. For example, the electric potential may be larger than 100 V, in particular larger than 1 kV, e.g. between 1 kV and 100 kV, to stabilize a stream of the polymer melt ejected from the nozzle and/or to direct the polymer melt from the nozzle towards the collector.

At the same time, arcing between the nozzle and the heater due to the high electric field strengths arising from the electrical potential applied to the nozzle may be prevented by the shape of the insulating spacer protruding into the heater. For example, the insulating spacer may protrude into the heater by at least 2 mm, or by at least 3 mm, preferably by at least 4 mm, and/or may protrude through the heater in some embodiments.

In preferred embodiments, the insulating spacer comprises external threads, the heater comprises internal threads, and the external threads of the insulating spacer engage with the internal threads of the heater.

Accordingly, the print-head may be formed in a compact fashion, as the heater may be screwed onto the insulating spacer to form a solid mechanical connection and may result in a tight and/or air free connection of the parts, e.g. to heat the solid polymer base material and/or the polymer melt through the insulating spacer.

The skilled person will appreciate that the heater may be an assembly of parts constituting a composite "hot-end" and may comprise a plurality of components, in particular a heating element, such as a heating coil in a heating cartridge, a heater body for transferring heat from the heating element towards a passage of the solid polymer base material/polymer melt, such as a heater block with a large thermal conductivity (e.g. made of metal), and a thermocouple or thermistor for determining a current temperature of the heater body. In some embodiments, the heater body is a monolithic heater block, e.g. made of a metal, to improve heat transfer from the heating element towards an inner passage of the heater block, although the heater body may also be a composite heater body in some embodiments.

Preferably, the heater body is provided with the internal threads to engage with the external threads of the insulating spacer, such as to directly transfer heat from the heater body towards the insulating spacer, while preventing electric losses or arcing through the insulating spacer to the heater body and/or the heating element.

In preferred embodiments, the insulating spacer at least partially surrounds the nozzle.

The nozzle may be inset into the insulating spacer to enclose proximal portions of the nozzle in the insulating spacer. For example, an intake portion of the nozzle may protrude into the insulating spacer by at least 1 mm, by at least 2 mm, or by at least 3 mm, and may be held in an accommodating cavity of the insulating spacer. Accordingly, the insulating spacer may be interposed between neighboring portions of the heater and the nozzle, e.g. radially and axially, such as to reduce an electric field strength between the nozzle and the heater. The reduced electric field strength between the nozzle and the heater may improve heater operation, may prevent arcs, and may also improve directionality of the polymer melt towards the collector by attenuating electric field lines between the heater and the nozzle.

Preferably, the nozzle is mounted in the insulating spacer, such as to form a compact hot nozzle assembly, with the insulating spacer separating the nozzle and the heater.

In preferred embodiments, the insulating spacer comprises internal threads, the nozzle comprises external threads, and the internal threads of the insulating spacer engage with the external threads of the nozzle.

The nozzle may be screwed into the insulating spacer for obtaining a solid mechanical connection. The threaded connection may result in a tight and/or air free connection of the parts for improving heat transfer from the heater through the insulating spacer towards the nozzle. Hence, a solid connection between the nozzle and the insulating spacer may be provided through the threaded connection, such as for improving heat transfer between the nozzle and the insulating spacer. The threaded connection may also result in a modular system, e.g. allowing for exchanging the nozzle. In some embodiments, the nozzle and the insulating spacer engage via fine pitch thread.

In some embodiments, the insulating spacer and the heater are cast into an integral piece with an adhesive, preferably an adhesive cement.

The adhesive cement may improve electric insulation between the polymer melt and the heater and may improve heat transfer from the heater to the insulating spacer. Preferably, the adhesive cement also prevents inadvertent contact between the polymer melt and the heater. The insulating adhesive/adhesive cement may be provided between the threads of the heater and the insulating spacer, such as to improve the mechanical connection between and/or to improve heat transfer from the heater to the insulating spacer.

In some embodiments, the nozzle, the insulating spacer and the heater are fused into an integral piece with an adhesive.

The adhesive may in particular be provided in threaded connections between the insulating spacer and the heater and between the nozzle and the insulating spacer to improve heat transfer between the heater and the nozzle.

In preferred embodiments, the insulating spacer comprises an insulating spacer body extending between the nozzle and the heater and protruding into the heater, wherein the insulating spacer body comprises a central passage for guiding the polymer melt from the heater towards the nozzle.

The central passage may constitute a portion of a fluid path from the feeding mechanism towards the nozzle. Preferably, the central passage is straight and may align with a fluid path through the nozzle to guide the polymer melt through the central passage and into the nozzle along a straight path. The straight fluid path through the insulating spacer body aligning with the nozzle may reduce the amount of molten polymer material in the print-head and may shorten the passage of the polymer melt through the insulating spacer. The insulating spacer body may be thermally coupled to the heater, such as to heat the solid polymer base material and/or the polymer melt in the central passage. Preferably, the insulating spacer body is in contact with the heater, in particular the heater body, e.g. via external threads on the insulating spacer body.

In preferred embodiments, the heater is arranged at least partially around the insulating spacer body to heat solid polymer base material through the insulating spacer body.

For example, a heater body may be directly joined to the periphery of the insulating spacer body to surround a portion of the insulating spacer body and to transfer heat to the solid polymer base material/polymer melt through the insulating spacer body.

In preferred embodiments, a thermal conductivity of the insulating spacer body is larger than 1 W/K*m, in particular larger than 10 W/K*m, preferably greater than 25 W/K*m.

When the insulating spacer body has a comparatively large thermal conductivity, such as a thermal conductivity greater than 10 W/K*m or 25 W/K*m, the insulating spacer body may be employed for continuous heat transfer to the solid polymer base material and/or the polymer melt in the central passage, such as to melt the solid polymer base material and/or maintain the temperature of the polymer melt in the central passage. In particular, the solid polymer base material may be locally melted at the insulating spacer body before being ejected from the nozzle.

At the same time, the insulating spacer, and in particular the insulating spacer body, should have a maximum service temperature above the melting point of the solid polymer base material. Suitable solid polymer base materials for melt electro-writing may comprise polypropylene, polyethylene, polyphenylene sulfide, polyamide, polylactic acid, polyphenylene sulfide, Poly(ether-ether ketone) (PEEK), poly(ethylene-co-vinyl)alcohol, Poly(l-lactic acid), starch, poly(3-hydroxybutyrate), Cyclic butylene terephthalate oligomer, acetyl tributyl citrate, Polystyrene, poly(ε-caprolactone), Polylactide-poly(ethylene-glycol) Poly(vinylidene difluoride), Poly(hydroxymethyl-glycolide-co-ε-caprolactone), Poly(l-lactide-co-ε-caprolactone-co-acryloyl carbonate), Poly(urea-siloxane)s, or a mixture thereof. Accordingly, a maximum service temperature of the insulating spacer body may be above about 200° C., or may be above 300° C. or 400° C.

In preferred embodiments, the insulating spacer body is made of a ceramic spacer material, wherein the insulating spacer body in particular comprises or is substantially composed of aluminum nitride, or alumina.

Ceramic spacer materials may feature a comparatively high thermal conductivity, and may feature a relative dielectric constant above 4 and a high dielectric strength to prevent dielectric breakdown/arcing between the charged nozzle and the heater. For example, the aluminum nitride (AlN) based dielectric ceramic material known under the trademark name of "Shapal" may be employed to machine the insulating spacer body with a maximum service temperature above the melting point of most suitable solid polymer base materials, and can feature a thermal conductivity of about 100 W/K*m and a dielectric strength of 50 kV/mm (at 20° C.).

Preferably, the insulating spacer separates the nozzle and conductive portions of the heater along imaginary straight lines between them to attenuate electric fields between the nozzle and conductive portions of the heater.

In preferred embodiments, the insulating spacer comprises a dielectric shielding portion which radially protrudes from the insulating spacer body to attenuate electric fields between the heater and the nozzle.

The dielectric shielding portion may be a portion of a monolithic insulating spacer body or may be an insulating material piece joined to the insulating spacer body to attenuate electric fields between the nozzle and the heater, such as to improve directionality of the polymer melt deposition in the electro-writing mode and/or to prevent arcing between the nozzle and the heater. For example, the dielectric shielding portion may be joined to the outside of the insulating spacer body, e.g. via an engagement of external threads of the insulating spacer body and internal threads of the dielectric shielding portion, to form a composite insulating spacer separating the nozzle and the heater.

Preferably, the dielectric shielding portion is joined to the outside of the insulating spacer body with an insulating cement, e.g. with a dielectric strength above 1 kV/mm, such as to prevent arcing through a (threaded) joint between the insulating spacer body and the dielectric shielding portion.

In preferred embodiments, the dielectric shielding portion spatially screens the heater and the nozzle.

In other words, the dielectric shielding portion may obstruct imaginary straight lines extending between the heater and the nozzle. The skilled person will appreciate that the heater and the nozzle may be partially screened also by the insulating spacer body, e.g. when the insulating spacer is a composite insulating spacer and when the nozzle protrudes into the insulating spacer body. Hence, the screening action of the radially protruding dielectric shielding portion should be understood to obstruct imaginary straight lines between the heater and the nozzle along the periphery of the nozzle-heater combination arising due to a radial extension of the heater with respect to the central passage. For example, a radial extension of the insulating spacer may be larger in a shielding portion arranged between the heater and the nozzle with respect to the central passage than in a protruding portion, in which the insulating spacer protrudes into the heater, such that imaginary straight lines between radially protruding portions of the heater and the nozzle are screened by the shielding portion.

Preferably, a radial extension of the dielectric shielding portion is at least equal to a radial extension of the heater at least in a corresponding angular segment around the central passage.

In preferred embodiments, a radial extension of the dielectric shielding portion with respect to the central passage is larger than a radial extension of the heater, in particular by at least 10%, preferably by at least 20%.

The dielectric shielding portion may radially extend from the central passage to obstruct imaginary straight lines extending between the nozzle and radially extending portions of the heater, wherein the radial extension of the dielectric shielding portion with respect to the center passage is larger than the radial extension of the heater in a corresponding angular segment, such as to attenuate the electric field strength between the charged nozzle and the heater. For example, the dielectric shielding portion may be a dielectric disk radially protruding from the insulating spacer body, wherein a radial extension of the dielectric disk may be larger than the radial extension of the conductive portions of the heater.

In preferred embodiments, the dielectric shielding portion and the insulating spacer body are made of different materials, wherein the insulating spacer body in particular has a larger thermal conductivity than the dielectric shielding portion.

The insulating spacer body should provide comparatively high thermal conductivity to transfer heat to the polymer melt/solid polymer base material, whereas the dielectric shielding portion may feature a lower thermal conductivity, such as to reduce thermal losses at the dielectric shielding portion. In addition, the dielectric shielding portion may feature a larger dielectric strength and/or a larger relative dielectric constant than the insulating spacer body, such as to improve attenuation of the electric field strength between the heater and the nozzle. In other words, since a thermal conductivity requirement of the dielectric shielding portion may be lower than a thermal conductivity requirement for the insulating spacer body, the material of the dielectric shielding portion may be selected from a range of materials with larger dielectric strength/larger relative dielectric constant. In some embodiments, the dielectric constant of the dielectric shielding portion is greater than 4. As an example, the dielectric shielding portion may be machined from the ceramic material known under the trademark name of "Macor" having a thermal conductivity of 1.46 W/mK, a dielectric strength (DC) of about 130 kV/mm and a relative dielectric constant of about 6. However, this example should merely be seen as an exemplary silicon oxide based ceramic, while other ceramics, such as other silicon oxide based ceramics, zirconia based ceramics, silicon nitride based ceramics, alumina based ceramics, aluminum nitride based ceramics, or any mixture thereof, may equally be used in some embodiments.

In preferred embodiments, the insulating spacer body extends from the nozzle to an insulating feed tube, wherein a thermal conductivity of the feed tube is smaller than a thermal conductivity of the insulating spacer body.

The insulating feed tube may guide solid polymer base material towards the insulating spacer body, and may act as a heat break between the insulating spacer body and elements of the feed mechanism. The insulating feed tube and the insulating spacer body may be joined to each other to form a composite insulating fluid passage in the print-head. For example, the insulating feed tube and the insulating spacer body may be joined to each other with an insulating adhesive, such as to electrically insulate the solid polymer base material/polymer melt in the composite insulating fluid passage along the radial direction from the heater. Said composite insulating fluid passage may protrude through the heater to electrically insulate the heater and the polymer melt, e.g. as a composite insulating spacer.

In some embodiments, the insulating feed tube comprises a rigid ceramic portion joined to the insulating spacer body, wherein the rigid ceramic portion has a smaller thermal conductivity than the thermal conductivity of the insulating spacer body. The rigid ceramic portion may feature a comparatively high maximum service temperature to contact the insulating spacer body at the heater without material degradation.

The insulating feed tube, and in particular a rigid ceramic portion of the insulating feed tube, may protrude into the heater on an opposite side with respect to the insulating spacer body. In other words, the heater may surround a joint between the insulating feed tube and the insulating spacer body. Since the thermal conductivity of the feed tube may be lower than the thermal conductivity of the insulating spacer body, the solid polymer base material may be substantially melted at the joint between the insulating spacer body and the insulating feed tube.

In some embodiments, the print-head comprises a polymer feeding passage with a first section and a second section, wherein the first section is configured to hold the solid polymer base material and to guide the solid polymer base material towards the heater and the second section is configured to guide the polymer melt towards the nozzle.

The solid polymer base material may be fed into the print-head in the first section and moved through the print-head in solid form. Preferably, the polymer feeding passage leads up to the heater, such as to minimize a polymer melt reservoir in the print-head. In other words, the second section may be formed by a fluid passage surrounded by the heater, and may be substantially formed by the insulating spacer body and portions of the insulating feed tube surrounded by the heater in some embodiments. The diameter of said fluid passage in the second section may be smaller than 5 mm, in particular smaller than 4 mm, such as 3 mm. The diameter of the fluid passage in the second section may vary between the heater and the nozzle tip, e.g. the diameter may be about 3 mm at or close to the heater and may be between about 0.1 mm to about 1 mm, such as about 0.4 mm or about 0.2 mm, at the tip of the nozzle.

The volume of molten polymer material in the central passage between the heater and the nozzle tip may be smaller than about 1000 mm$^3$, or smaller than 400 mm$^3$, preferably smaller than about 200 mm$^3$, such as about 100 mm$^3$.

In preferred embodiments, the solid polymer base material is a polymer filament which is advanced by the feed mechanism towards the nozzle, wherein the feed mechanism in particular comprises frictional wheels.

The polymer filament may be advanced as a continuously fed solid polymer base material into the insulating spacer body and/or into the insulating feed tube. For example, the frictional wheels may feed the filament into the insulating spacer body to push polymer melt through the insulating spacer body and through the nozzle with the solid portions of the polymer filament.

In preferred embodiments, the feed mechanism is configured to controllably feed the polymer filament during operation to maintain a substantially constant pressure on the polymer melt at the nozzle.

For example, the feed mechanism may advance the polymer filament with a constant advance velocity to maintain a Taylor cone of the polymer melt at the tip of the nozzle for electro-writing.

In some embodiments, the feed mechanism is configured to advance the polymer filament towards the heater in accordance with an ejection rate of the polymer melt through the nozzle.

In some embodiments, the feed mechanism is configured to advance the polymer filament into the feeding tube, wherein a diameter of the feeding tube is configured to substantially correspond to a diameter of the polymer filament advanced by the feed mechanism.

In some embodiments, the diameter of the central passage of the insulating spacer body is configured to substantially correspond to a diameter of the polymer filament advanced by the feed mechanism.

For example, the feed mechanism may advance the polymer filament towards the print-head and into the feeding tube, wherein the filament may be advanced through the feeding tube towards the center passage of the insulating spacer body, such that the polymer filament is melted within the feeding tube and/or the insulating spacer body to create the polymer melt.

In preferred embodiments, the system further comprises an (electrically) grounded collector facing the print-head for receiving the polymer melt, wherein a distance between the collector and the nozzle is in particular smaller than the product of the dielectric constant of the insulating spacer and the distance between conductive portions of the heater and the nozzle.

In an electro-writing mode, the distance between the collector and the nozzle may be between about 10 mm and about 1 mm to deposit polymer fibers at a predetermined location of the collector. As the trajectory of the polymer melt from the nozzle towards the collector may substantially follow the electric field lines, the electric field strength between the tip of the nozzle and a collector should be higher than the electric field strength between the tip of the nozzle and the conductive portions of the heater.

In other words, the insulating spacer may be configured to attenuate electric fields between the nozzle and conductive portions of the heater with dielectric portions of the insulating spacer, such that an "effective electrostatic distance" between the nozzle and the collector may be shorter than the "effective electrostatic distance" between the nozzle and the heater. Said effective electrostatic distance may be defined by the smallest product of the dielectric constant and the distance of a path along the electric field lines between the respective elements, wherein said path need not be a straight line.

For example, when the insulating spacer material provides a relative dielectric constant of at least 4, the insulating spacer may space the nozzle and the heater by at least 2.5 mm along imaginary straight lines between the nozzle and the heater. Further, the dielectric shielding portion may radially protrude away from a central fluid passage through the print-head, such as to attenuate electric fields at the periphery of the heater-nozzle combination.

An effective arc gap between conductive portions of the heater and the nozzle may be increased to correspond to the effective electrostatic distance and/or to correspond to a path around the dielectric shielding portion along the periphery of the insulating spacer.

In some embodiments, the dielectric shielding portion protrudes away from the central passage such that an arc gap through air between the nozzle and the heater does not follow a straight line.

The distance between the heater and the nozzle may nonetheless be limited, such as to reduce heat transfer/losses between the heater and the nozzle through the insulating spacer.

In some embodiments, the distance between the heater and the nozzle is smaller than 10 mm, in particular smaller than 5 mm, wherein the distance between the nozzle and the first section is preferably smaller than 20 mm.

Accordingly, the solid polymer base material may be melted close to the nozzle e.g. to enable on demand melting of the solid polymer base material in the print-head.

In some embodiments, the insulating spacer is configured to separate the nozzle and the heater with a dielectric material selected such that a breakdown voltage between the nozzle and the heater is larger than a breakdown voltage between the nozzle and the collector in an electro-writing mode of the system.

In preferred embodiments, a distance between the collector and the nozzle is smaller than 10 mm, in particular smaller than 8 mm, when electro-writing with the polymer melt onto the collector.

In preferred embodiments, the system further comprises a control system for controlling the feed mechanism and the print-head, wherein the control system is configured to select one of a plurality of driving modes, the plurality of driving modes comprising at least an electro-writing mode and a fused deposition modeling mode, wherein the control system is in particular configured to adjust a feed rate of the feed mechanism and a voltage applied to the nozzle based on the driving modes.

The control system may comprise a single control unit or may comprise a plurality of control units which may be functionally connected. The control units may comprise a microcontroller, an ASIC, a PLA (CPLA), an FPGA, or other control device, including control devices operating based on software, hardware, firmware, or a combination thereof. The control devices can include an integrated memory, or communicate with an external memory, or both, and may further comprise interfaces for connecting to sensors, devices, appliances, integrated logic circuits, other controllers, or the like, wherein the interfaces may be configured to receive or send signals, such as electrical signals, optical signals, wireless signals, acoustic signals, or the like.

To switch between different driving modes, the control system may send control signals to the feed mechanism to adjust a feed rate of the solid polymer base material, such as from a high value of the fused deposition modeling mode to a lower feed rate, e.g. for forming a Taylor cone at the tip of the nozzle for electro-writing.

The control system may also send control signals to a high-voltage source to apply or adjust an electrical potential to the nozzle, such as for initiating an electro-writing mode of the system with a high-voltage applied between the nozzle and the collector and/or for reducing or switching off the electrical potential to the nozzle to switch to a fused deposition modeling mode without the assistance of an electric field.

The control system may be configured to control a displacement assembly for driving a relative motion of the print-head and the collector. For example, the control system may send control signals to an actuator of the displacement assembly to form an intended structure and/or to switch between driving modes.

In some embodiments, a virtual replica of the three-dimensional geometry of an intended polymer structure may be provided in a memory of the control system or an external computing system and may comprise or be translated into control instructions for a displacement assembly to drive a motion of the print-head and/or the collector. The control system may then drive the displacement assembly in accordance with the control instructions for manufacturing the intended polymer structure and/or based on received signals, e.g. sensor readings.

To switch between different driving modes, the control system may send control signals to the displacement assembly to adjust a spacing between the nozzle and the collector, such as for defining a gap for electro-writing. For example, the control system may trigger the displacement assembly to establish a distance between the collector and the nozzle between about 1 mm and about 10 mm for the electro-writing mode, and to follow the outline of previously deposited layers in a fused deposition modeling mode.

According to a second aspect, the invention relates to a method for electro-writing of a polymer melt. The method comprises insulating a nozzle and a heater with an insulating spacer, wherein the insulating spacer is at least partially surrounded by the heater. The method further comprises selectively feeding solid polymer base material towards the heater, and heating the solid polymer base material beyond its melting point with the heater to generate the polymer melt. The method further comprises applying an electric potential to the nozzle, and ejecting the polymer melt via the nozzle.

In preferred embodiments, the method comprises heating the solid polymer base material through the insulating spacer.

In preferred embodiments, the method comprises joining the insulating spacer and the heater via external threads of the insulating spacer and internal threads of the heater.

In preferred embodiments, the method comprises joining the insulating spacer and the nozzle via internal threads of the insulating spacer and external threads of the nozzle.

In preferred embodiments, the method comprises casting the insulating spacer and the heater into an integral piece with an adhesive cement.

In preferred embodiments, the method comprises guiding the polymer melt from the heater towards the nozzle through a central passage of the insulating spacer.

In preferred embodiments, the method comprises heating the solid polymer base material through the insulating spacer body.

In preferred embodiments, the method comprises advancing a polymer filament towards the insulating spacer.

In preferred embodiments, in the method comprises controllably feeding the polymer filament during operation to maintain a substantially constant pressure on the polymer melt at the nozzle.

In preferred embodiments, the method further comprises providing an (electrically) grounded collector facing the print-head for receiving the polymer melt, wherein a distance between the collector and the nozzle is smaller than the product of the dielectric constant of the insulating spacer and the distance between conductive portions of the heater and the nozzle.

In some embodiments, the method further comprises activating a fused deposition modeling mode, wherein the electric potential applied to the nozzle is below a threshold for electro-writing of the polymer melt, selectively depositing the polymer melt in the fused deposition modeling mode to form a solid polymer structure, switching to an electro-writing mode, wherein the electric potential applied to the nozzle is above a threshold for electro-writing of the polymer melt, and selectively depositing the polymer melt as electro-written polymer fibers onto the solid polymer structure along pre-determined deposition lines in the electro-writing mode.

According to a third aspect, the invention relates to a method of additively forming a part of a polymer melt ejected from a print-head onto a collector. The method comprises, in a fused deposition modeling mode, selectively depositing the polymer melt to form a solid polymer structure on the collector, wherein a voltage between a nozzle of the print-head and the collector is below a threshold for electro-writing of the polymer melt. The method further comprises switching to an electro-writing mode, wherein the voltage between the nozzle and the collector is above a threshold for electro-writing of the polymer melt, and, in the electro-writing mode, selectively depositing the polymer melt with the print-head to form electro-written polymer fibers along pre-determined deposition lines onto the solid polymer structure.

For example, the method may comprise printing a rigid outer scaffold in the fused deposition modeling mode, and filling an inner volume at least partially surrounded by the scaffold with polymer fibers in the electro-writing mode, e.g. by connecting portions of the solid polymer structure with the electro-written polymer fibers. As another example, in the electro-writing mode, a microstructure may be deposited on the surface of a solid polymer structure formed in the fused deposition modeling mode, e.g. as a micro-structured coating. The steps of forming of the solid polymer structure with the fused deposition modeling mode and the electro-writing mode can be performed with a single print-head, e.g. when the print-head comprises the insulating spacer discussed above.

In the fused deposition modeling mode, the polymer melt may be deposited as polymer beads or filaments with a thickness and/or width corresponding substantially to a nozzle exit diameter of the nozzle. The voltage between the nozzle and the collector may be substantially zero in the fused deposition modeling mode, e.g. both the nozzle and the collector may be (electrically) grounded.

In the electro-writing mode, the voltage between the nozzle and the collector may be suitable for controlling a flow of the polymer melt from the print-head towards the collector, e.g. the voltage may be larger than too V or larger than 1 kV, such as between 2 kV and to kV. The voltage may be suitable for inducing a tapering of the polymer melt at the tip of the nozzle, such that a diameter of polymer fibers deposited on the collector and/or on the solid polymer structure may be smaller than an exit diameter of the nozzle, e.g. smaller than half the nozzle exit diameter. For example, in the electro-writing mode, polymer fibers with a diameter between about 1 µm and about 50 µm may be deposited on the collector and/or the solid polymer structure.

In the electro-writing mode, the distance between the tip of the nozzle and the collector may be larger than in the fused deposition modeling mode. Further, an extrusion rate of extruding the polymer melt from the nozzle may be larger in the fused deposition modeling mode than in the electro-writing mode, such as more than twice the extrusion rate.

The method may be advantageously employed for deterministic electro-writing of solid polymer structures, e.g. for the controlled manufacturing of implants or scaffolds for biomedical applications with well-defined structural geometries, or for forming filters.

For example, the method may comprise forming a first structure in the fused deposition modeling mode for defining a geometry of solid portions of the solid polymer structure, and forming a second structure in the electro-writing mode comprising a deterministic pattern of polymer fibers with a diameter smaller than 100 µm, such as for forming a porous scaffold, in particular a biocompatible scaffold connecting to and/or at least partially overlapping with the solid portions of the solid polymer structure.

Preferably, the method comprises feeding a polymer filament towards the nozzle, in particular feeding the same filament towards the nozzle in the electro-writing mode and in the fused deposition modeling mode, for ejecting the polymer melt from the nozzle towards the collector and/or for controlling the extrusion speed/rate from the nozzle.

The method according to the third aspect may be combined with the method of the second aspect and vice versa to form composite parts of polymer material, e.g. with polymer material layers formed in different deposition modes having different physical characteristics. Further, the skilled person will appreciate that any of the methods of the second aspect and the third aspect may be advantageously used with the system according to the first aspect in some embodiments.

According to a fourth aspect, the invention relates to a computer program or computer program product comprising machine readable instructions, which when executed on a control system implement a method according to the second aspect or the third aspect, or drive a system according to the first aspect.

DETAILED DESCRIPTION OF EMBODIMENTS

The features and numerous advantages of the system and corresponding method according to the present invention will best be understood from a detailed description of preferred embodiments with reference to the accompanying drawings, in which:

FIG. 1 schematically illustrates an example of an electro-writing system;

Figure 7:
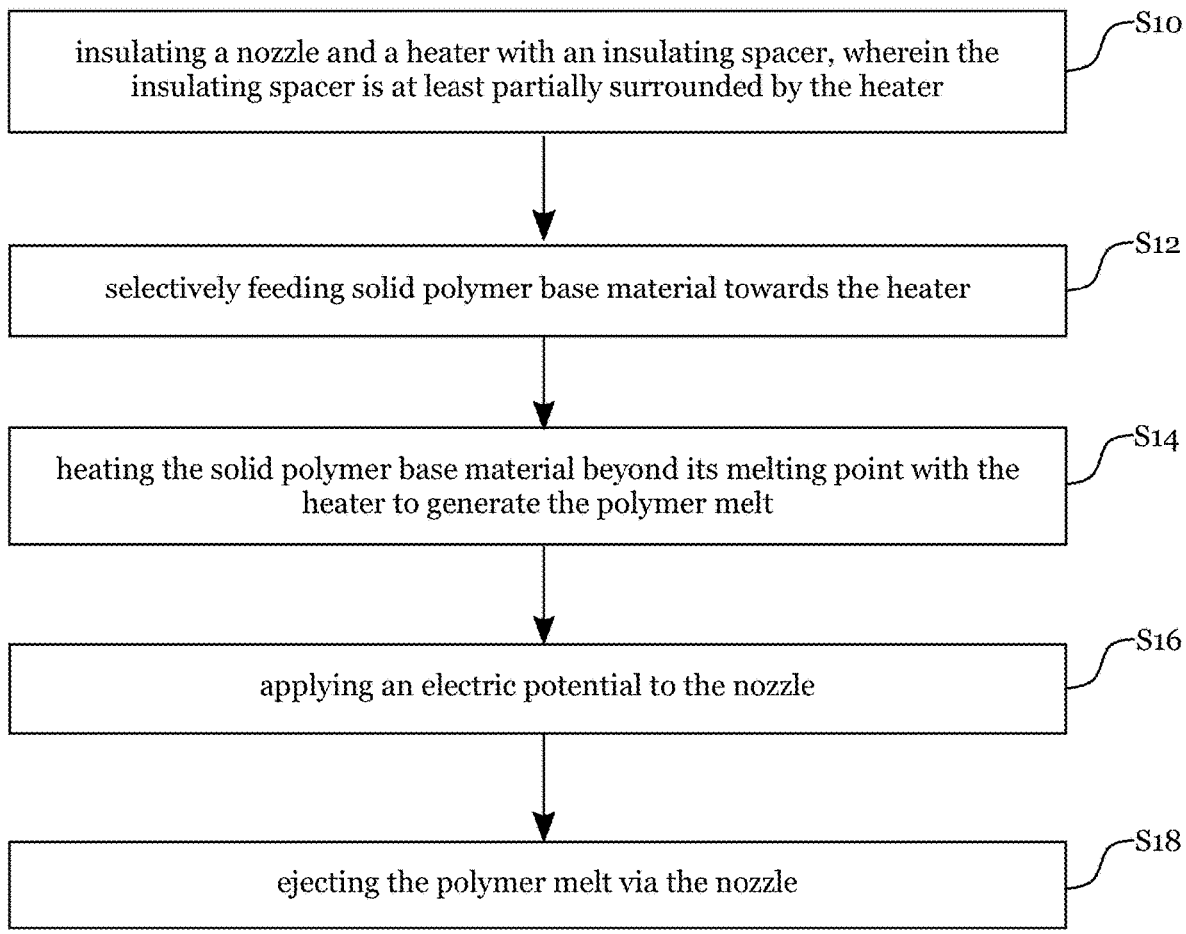
Figure 8A:
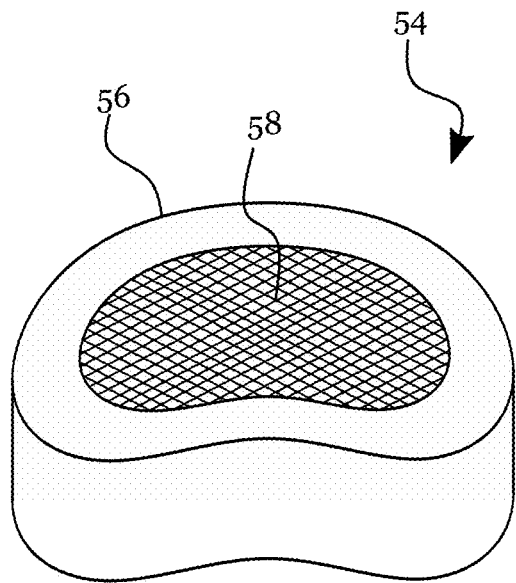
Figure 8B:
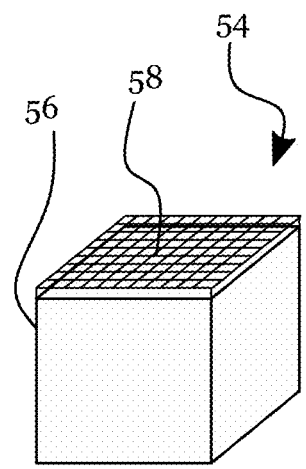
Figure 8C:
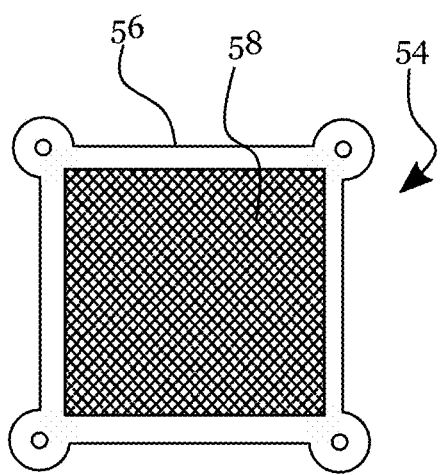

FIG. 7 schematically illustrates a method for electro-writing of a polymer material according to an example; and FIGS. 8A-8C illustrate examples of composite polymer structures with different geometries.

Figure 1:
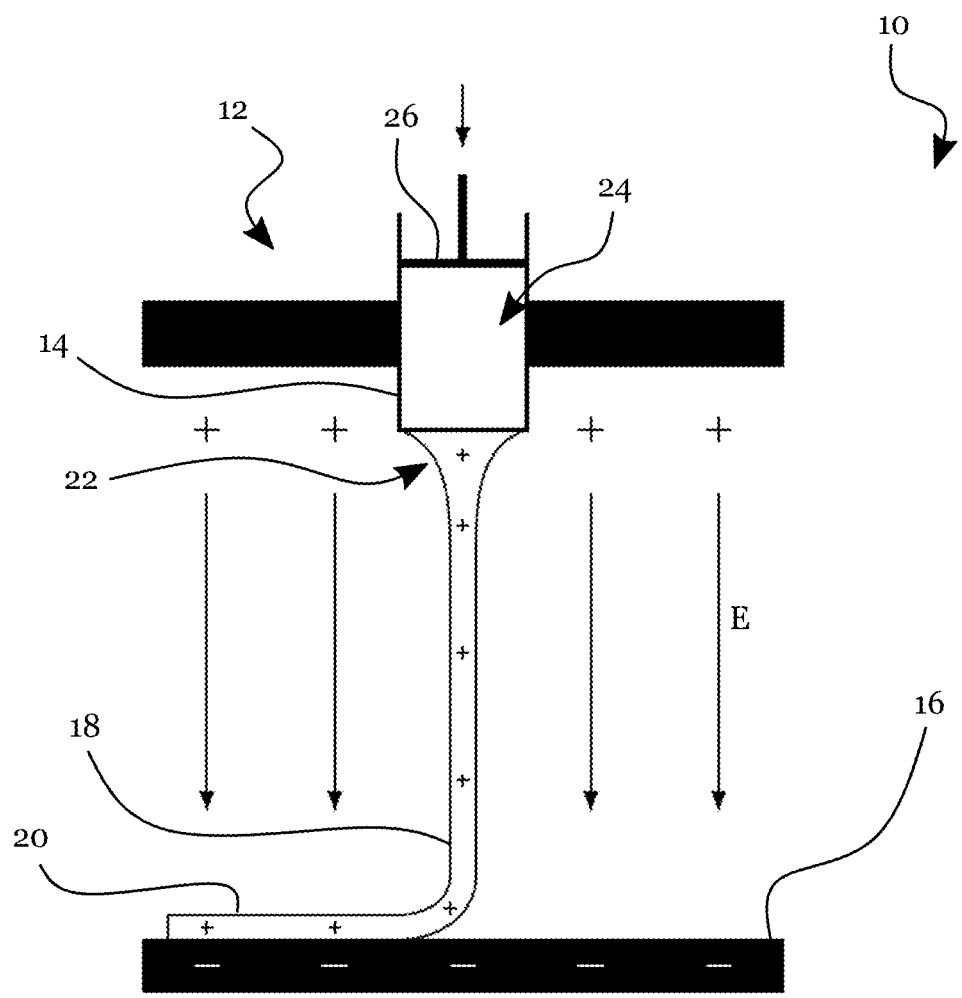

FIG. 1 schematically illustrates an electro-spinning/writing system 10 according to an example. The electro-spinning/writing system 10 comprises a print-head 12 with a conductive nozzle 14 arranged above a conductive collector plate 16. A voltage can be applied between the print-head 12 and the collector plate 16 (as illustrated by exemplary charges +/− at the print-head 12 and the conductive collector plate 16) and may induce an electric field (schematically illustrated by straight arrows "E") bridging the gap between the print-head 12 and the collector plate 16. A stream of polymer material 18 may be ejected from the nozzle 14 towards the collector plate 16 to form a layer of received polymer material 20 on the collector plate 16.

The print-head 12 and the collector plate 16 may be moved relative to each other in a transverse plane, such that the stream of polymer material 18 may be deposited as a polymer fiber on the collector plate 16, wherein the extension of the polymer fiber may substantially follow a direction of relative movement between the print-head 12 and the collector plate 16 in an electro-writing mode of the system 10. In an electro-spinning mode of the system 10, the fibers may be electrospun onto a predetermined deposition region, such that the orientation of the deposited polymer fibers may also be randomized in some embodiments.

To drive a relative motion in the transverse plane and to define the geometry of the deposited polymer structure, the print-head 12 and/or the collector plate 16 may be coupled to a translation stage to drive a relative motion of the print-head 12 and the collector plate 16 in the transverse plane. For example, the print-head 12 may be mounted to a carriage (not shown) to be translated with respect to the collector plate 16 in a transverse direction, e.g. along perpendicular X/Y axes extending substantially parallel to the surface of the collector plate 16.

The polymer material 18 may be a polymer melt obtainable by heating a polymer base material 24, such as solid polymer granulates or polymer filaments, beyond its melting point. For example, polymer granulates may be heated in the print-head 12 and extruded through the nozzle 14, such as by pressuring the polymer melt with a piston 26, e.g. with pressurized air, for forcing the polymer melt through the nozzle aperture, as illustrated in FIG. 1. In some embodiments, the polymer base material 24 may be provided as a filament which is fed into the print-head 12 to be heated in the print-head 12 and extruded through the nozzle 14, e.g. while being pushed by the solid polymer filament (not shown).

The at least partially liquid polymer material 18 may be charged in the nozzle 14 (as schematically illustrated by positive charges in the polymer stream) and may be pulled from the nozzle 14 towards the collector plate 16. The electric forces acting on the polymer material 18 may induce a tapering 22 of the polymer material 18 at the nozzle 14. The tapering 22 may form an approximated Taylor cone from which a jet of charged polymer material 18 may be ejected towards the collector plate 16. As the polymer material 18 tapers away from the nozzle 14, a stream of the polymer material 18 between the nozzle 14 and the collector plate 16 may feature a smaller diameter than the diameter of the nozzle 14 and may be deposited as a polymer fiber in the layer of polymer material 20. For example, the polymer material 18 may be deposited as polymer fibers featuring a thickness of less than 100 µm, e.g. between 0.2 µm and 100 µm or between 5 µm and 50 µm, while the nozzle diameter may be between 0.1 mm and 1 mm, such as between 0.2 mm and 0.8 mm, e.g. 0.3 mm, 0.4 mm, or 0.6 mm.

The polymer material 18 may solidify during the passage between the nozzle 14 and the collector 16 by cooling and/or evaporation of solvent constituents, such that a viscosity of the polymer material 18 may increase the closer the polymer material 18 gets to the collector plate 16. Solidifying or solid polymer fibers may then be deposited on the collector plate 16 or on previously received layers of polymer material 20.

The system 10 may gradually deposit a plurality of layers of polymer material 20 on top of each other, wherein the geometry of each layer of polymer material 20 may differ to construct a three-dimensional shape from a plurality of essentially two-dimensional slices/layers. Depending on the distance and voltage between the nozzle 14 and the collector 16, the polymer fibers may be deposited at predetermined locations or deposition regions, to generate a deterministic geometry of received polymer material 20 on the collector 16. For example, in an electro-writing mode, a distance between the nozzle 14 and the collector 16 or the uppermost layer of received polymer material 20 may be between about 1.5 mm to about 10 mm, e.g. between about 2.5 mm and about 8 mm, to enable electro-writing with the polymer material 18.

In accordance with an increasing deposition thickness of the layers of polymer material 20 on the collector plate 16, a distance between the print-head 12 and the collector 16 may be adjusted, such that a distance between the nozzle 14 and the uppermost layer of polymer material 20 remains substantially constant. A substantially constant distance between the collector plate 16 and the uppermost layer of polymer material 20 may avoid proximity effects of the nozzle 14 onto the deposited layers of polymer materials 20, such as melting of previously deposited fibers, attraction of polymer material 18, 20 towards the nozzle 14, or distortion of the Taylor cone.

The voltage applied between the nozzle 14 and the collector plate 16 may be increased in accordance with the varying spacing between the collector plate 16 and the nozzle 14, such as to maintain a substantially constant electric field at the nozzle 14 for inducing the tapering 22 and for controlling the flow of polymer material 18 from the nozzle 14 towards the collector plate 16. For example, a voltage of about 5 kV may be applied between the nozzle 14 and the collector plate 16 at a distance between the nozzle 14 and the collector plate 16 of about 3 mm, such as to deposit a solidifying polymer fiber in a predetermined location onto the collector plate 16, and the voltage may be increased in accordance with an increasing distance between the collector plate 16 and the nozzle 14. Hence, three-dimensional shapes of the polymer material 18, 20 may be constructed by the consecutively deposited layers of polymer material 20.

Figure 2:
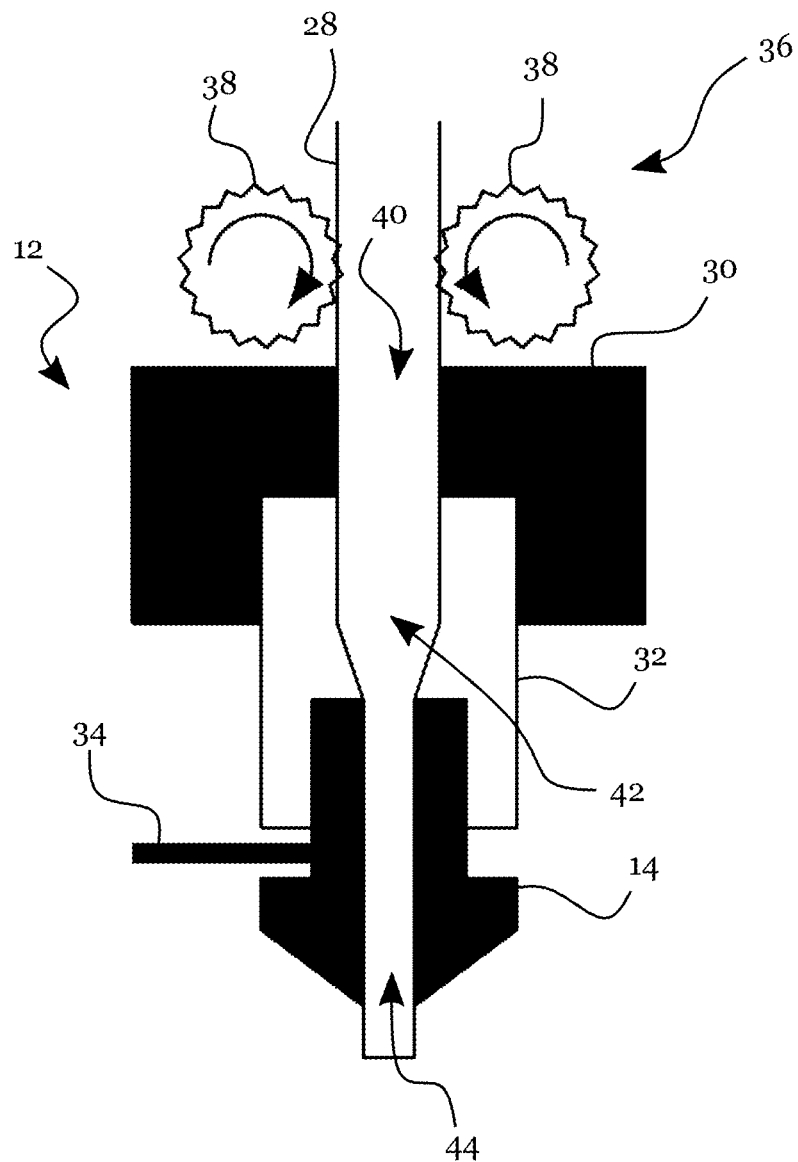
FIG. 2 illustrates an example of a print-head for electro-writing with continuously fed solid polymer filament.

FIG. 2 illustrates an example of a print-head 12 for electro-writing with continuously fed solid polymer base material 24 in the form of a solid polymer filament 28. The print-head 12 comprises a heater 30, an insulating spacer 32 and a nozzle 14, wherein the insulating spacer 32 separates the nozzle 14 and the heater 30. The nozzle 14 comprises a conductive portion and is coupled to a conductor 34 for applying an electrical potential to the nozzle 14. At the same time, the insulating spacer 32 interposed between the heater 30 and the nozzle 14 electrically insulates the nozzle 14 and the heater 30, such that the electrical potential applied to the nozzle 14 may only negligibly affect an operation of the heater 30.

The print-head 12 is coupled to a feed mechanism 36 illustrated by frictional wheels 38 to engage the solid polymer filament 28 on opposite sides and to transfer the solid polymer filament 28 towards a central passage 40 through the heater 30. The feed mechanism 36 may be mounted on the print-head 12 to pull the solid polymer filament 28 into the print-head 12 or may be provided outside of the print-head 12 to push the solid polymer filament 28 towards the print-head 12 through a guiding tube (not shown).

The heater 30 may be configured to heat the solid polymer filament 28 beyond its melting point in the print-head 12 to create a polymer melt in the print-head 12 via an electrical current. For example, a heating coil (not shown) in the heater 30 may receive an electrical current to increase the temperature of the heater 30 to a target temperature for melting the polymer base material 24 in a central passage of the heater 40 and for maintaining a liquid phase of the polymer melt in the insulating spacer 32 and the nozzle 14. The heating coil of the heater 30 may transfer the heat through a heater body of the heater 30 to the insulating spacer 32 to indirectly heat the nozzle 14 through the insulating spacer 32. The advancing of the polymer filament 28 may push polymer melt generated by the heater 30 through a central passage 42 in the insulating spacer 32 towards a fluid path 44 in the nozzle 14. The polymer melt may then be ejected through the nozzle 14 for electro-writing of polymer material 14 onto a collector 16.

In an electro-writing mode, the nozzle 14 may be charged via the conductor 34 to create an electric field between the nozzle 14 and a collector 16 (not shown in FIG. 2) for controlling a flow of the polymer material 18 from the nozzle 14 towards the collector 16. The charged nozzle 14 may further charge the polymer material 18 (not shown in FIG. 2) which may assist a guided deposition of the polymer material 18 onto the collector 16.

The insulating spacer 32 partially surrounds the nozzle 14 and spaces the nozzle 14 from the heater 30 to electrically insulate the nozzle 14 from the heater 30. As illustrated in FIG. 2, the nozzle 14 may be mounted within the insulating spacer 32, such that portions of the nozzle 14 adjacent to the heater 30 may be enclosed by the insulating spacer 32. Accordingly, the insulating spacer 32 may be interposed between respective joining portions of the nozzle 14 and the heater 30, such as to attenuate the electric field between the nozzle 14 and the heater 30 and/or to prevent arcing between the nozzle 14 and the heater 30.

On an opposite side of the insulating spacer 32, the insulating spacer 32 protrudes into the heater 30. Accordingly, the heater 30 may heat the polymer base material 24 and/or the polymer melt in the central passage 42 of the insulating spacer 32 through the body of the insulating spacer 32 accommodated in the heater 30. Preferably, the heater 30 is in direct contact with the insulating spacer 32, such as to transfer heat to the insulating spacer 32 for maintaining a temperature of the polymer melt while the polymer melt advances along the central passage 42 of the insulating spacer 32 towards the nozzle 14.

Preferably, the insulating spacer 32 is mounted at least partially within the heater 30, e.g. via engaging threads of the insulating spacer 32 and the heater 30, to maintain physical contact between the insulating spacer 32 and the heater 30 and to improve heat transfer from the heater 30 to the insulating spacer 32. A bond between the heater 30 and the insulating spacer 32 may be improved by an adhesive, such as an adhesive cement.

The insulating spacer 32 should be designed to withstand the local electric field strengths in order to prevent arcing between the nozzle 14 and the heater 30. While the insulating spacer 32 is shown to only partially protrude into the heater 30 in FIG. 2, in some embodiments, e.g. by at least 2 mm, by at least 3 mm or by at least 4 mm, the insulating spacer 32 may also protrude through the heater 30 such that the polymer base material 24 and/or the polymer melt may be heated by the heater 30 through the insulating spacer 32 to create the polymer melt.

The polymer melt may pass from the central passage 40 of the heater 30 through the central passage 42 of the insulating spacer 32 towards the fluid path 44 in the nozzle 14, wherein the fluid path 44 in the nozzle 14 may be aligned with the central passage 40 of the heater 13 on one side and with the fluid path 44 of the nozzle 14 on the opposite side.

Preferably, a fluid path through the print-head 12 is substantially straight and defines an axial direction of the print-head 12, wherein the central passage 40 through the heater 30, the central passage 42 through the insulating spacer 32, and the fluid path 44 of the nozzle 14 may be substantially aligned with the axial direction. Hence, the polymer base material 24 may enter heated portions of the print-head 12 along the axial direction to create the polymer melt using the heater 30, and the polymer melt may be transferred along the axial direction through the insulating spacer 32 towards the nozzle 14, e.g. to be ejected towards the collector 16 along the axial direction.

As illustrated in FIG. 2, the central passage 42 of the insulating spacer 32 may taper between the heater 30 and the nozzle 14, such as from a larger diameter at the side of the heater 30 towards a smaller diameter at the side of the nozzle 14. However, the diameter of the central passage 42 through the insulating spacer 32 may also be substantially constant and may correspond to a diameter of the nozzle 14 at the intake side of the nozzle 14. For example, the central passage 42 of the insulating spacer 32 may have the same diameter at the heater 30 and at the intake side of the nozzle 14, and the fluid path 44 of the nozzle 14 may taper from an initial larger diameter towards a smaller diameter at or close to the tip of the nozzle 14.

In FIG. 2, the insulating spacer 32 is illustrated as a monolithic block protruding into the heater 30 on one site and accommodating the nozzle 14 at an opposite side with a substantially constant cross-section along the axial direction. However, the skilled person will appreciate that the insulating spacer 32 may also be a composite insulating spacer 32 and may also have a varying cross-section along the axial direction.

Figure 3C:
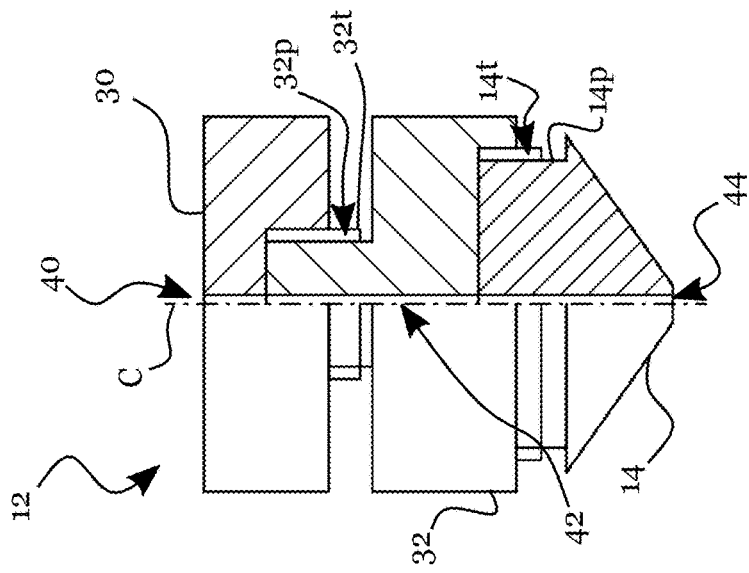
FIGS. 3A-3C illustrate schematic examples of print-heads with varying geometries of the nozzle, the insulating spacer and the heater.
Figure 3B:
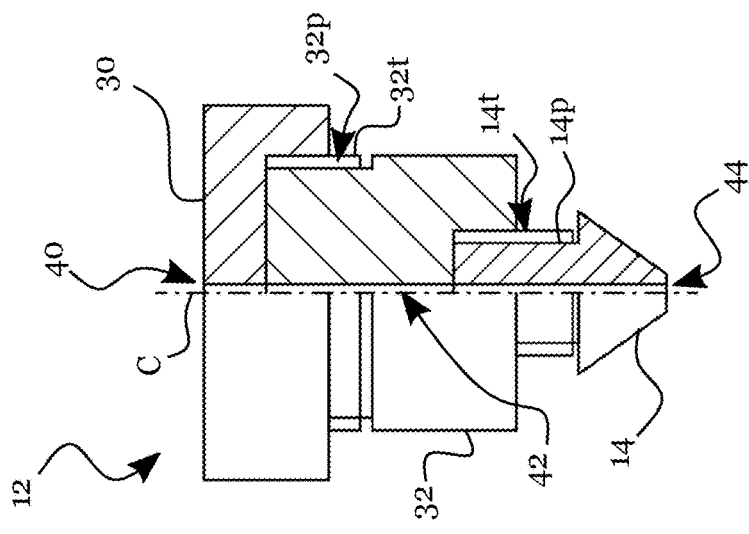
Figure 3A:
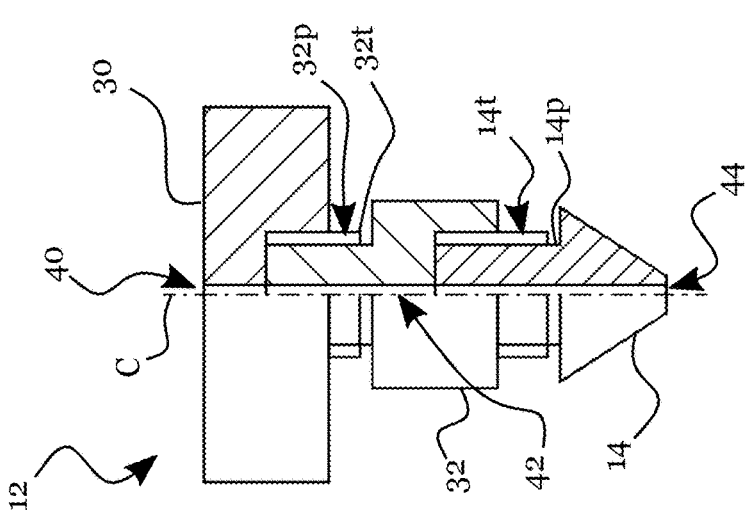

FIGS. 3A, 3B and 3C illustrate schematic examples of print-heads 12 with varying geometries of the nozzle 14, the insulating spacer 32 and the heater 30. Each figure is split into two illustrative portions separated by a central axis C of the print-head 12 along the axial direction. On the left side of each figure, a side view of one half of the print-head 12 is shown, while on the right side, a sectional view through the other half of the print-head 12 is shown in order to illustrate the geometry of the respective components of the print-head 12.

In each figure, the nozzle 14 protrudes into an accommodating cavity of the insulating spacer 32 with a substantially cylindrical intake portion 14p of the nozzle 14, wherein the cross-section of the accommodating cavity substantially corresponds to the cross-section of the intake portion 14p of the nozzle 14 to mount the nozzle 14 in the insulating spacer 32. The insulating spacer 32 further comprises a substantially cylindrical protruding portion 32p arranged opposite the accommodating cavity and protruding into a cavity of the heater 30.

The cylindrical intake portion 14p of the nozzle 14 and the protruding portion 32p of the insulating spacer 32 may each be provided with schematically illustrated external threads 14t, 32t to engage with corresponding internal threads (not illustrated) of the insulating spacer 32 and the heater 30, respectively. In other words, the nozzle 14 may be mounted in the insulating spacer 32 through an engagement of external threads 14t on the intake portion 14p of the nozzle 14 engaging with internal threads of the accommodating cavity in the insulating spacer 32. Similarly, the insulating spacer 32 may be mounted in the heater 30 through an engagement of external threads 32t on the protruding portion 32p of the insulating spacer 32 engaging with internal threads of the cavity in the heater 30.

In FIG. 3A an example is shown, wherein the cross-section of the cylindrical intake portion 14p of the nozzle 14 corresponds substantially to the cross-section of the protruding portion 32t of the insulating spacer 32. Accordingly, the insulating spacer 32 may be provided as an interposing spacing element for separating the nozzle 14 and the heater 30 of a print-head 12 to be reconfigured for electro-writing. For example, the insulating spacer 32 may be mounted in a heater body of a fused deposition modeling printer, also known as a "fused filament fabrication" printer, and a nozzle 14 for electro-writing may be mounted in the insulating spacer 32 to convert a print-head of a fused deposition modeling printer to an electro-writing print-head 12.

Further, in FIG. 3A the maximum radial extension of the insulating spacer 32 along the axial direction corresponds substantially to a maximum radial extension of the nozzle 14 along the axial direction. However, the maximum radial extension of the insulating spacer 32 should preferably be larger than the maximum radial extension of the nozzle 14 such as to improve a shielding of electric fields between the nozzle 14 and conductive portions of the heater 30.

FIG. 3B shows another example, wherein the maximum radial extension of the insulating spacer 32 is larger than the maximum radial extension of the nozzle 14 with respect to the central axis C, such that the insulating spacer 32 obstructs straight imaginary lines between the nozzle 14 and the heater 30. In other words, the insulating spacer 32 spatially screens the heater 30 and the nozzle 14.

In addition, in FIG. 3B a diameter of the protruding intake portion 14p of the nozzle 14 is smaller than a diameter of the protruding portion 32p of the insulating spacer 32 with respect to the central axis C. A cross-section of the accommodating cavity of the insulating spacer 32 corresponds substantially to a cross-section of the intake portion 14p of the nozzle 14, while a cross-section of the protruding portion 32p of the insulating spacer 32 corresponds substantially to a cross-section of the cavity of the heater 30, such that the nozzle 14 may nonetheless be mounted solidly in the insulating spacer 32 and the insulating to spacer 32 may be solidly mounted in the heater 30.

FIG. 3C illustrates another example, wherein a maximum radial extension of the insulating spacer 32 corresponds substantially to a maximum radial extension of the heater 30 with respect to the central axis C, such that the insulating spacer 32 spatially screens the nozzle 14 and the heater 30.

It is also noted that, in FIG. 3C, the cross-sections of the different protruding portions 14p, 32p of the insulating spacer 32 and the nozzle 14 are again different, i.e. a diameter of the protruding intake portion 14p of the nozzle 14 is larger than a diameter of the protruding portion 32p of the insulating spacer 32 with respect to the central axis C.

However, the skilled person will appreciate that the examples of FIGS. 3A-3C are merely exemplary and that the features of the examples may be differently combined in some embodiments. For example, in preferred embodiments, the diameter of the protruding intake portion 14p of the nozzle 14 may be equal to a diameter of the protruding portion 32p of the insulating spacer 32 with respect to the central axis C, while a maximum radial extension of the insulating spacer 32 is at least equal to or is greater than a maximum radial extension of the heater 30 and of the nozzle 14 with respect to the central axis C.

When the maximum radial extension of the insulating spacer 32 is at least equal to a maximum radial extension of the heater 30 and of the nozzle 14, the insulating spacer 32 may screen the nozzle 14 and the heater 30 to attenuate electric fields between the nozzle 14 and the heater 30, and may also increase an arc gap between the nozzle 14 and the heater 30 along the periphery of the print-head 12.

In some embodiments, the insulating spacer 32 comprises a central insulating spacer body surrounding the central passage 42, wherein the nozzle 14 and the heater 30 are separated by the central insulating spacer body and are mounted to the central insulating spacer body on opposite sides, and further comprises a dielectric shielding portion radially protruding from the insulating spacer body to attenuate electric fields between the nozzle 14 and the heater 30 along the periphery of the print-head 12

Figure 4A:
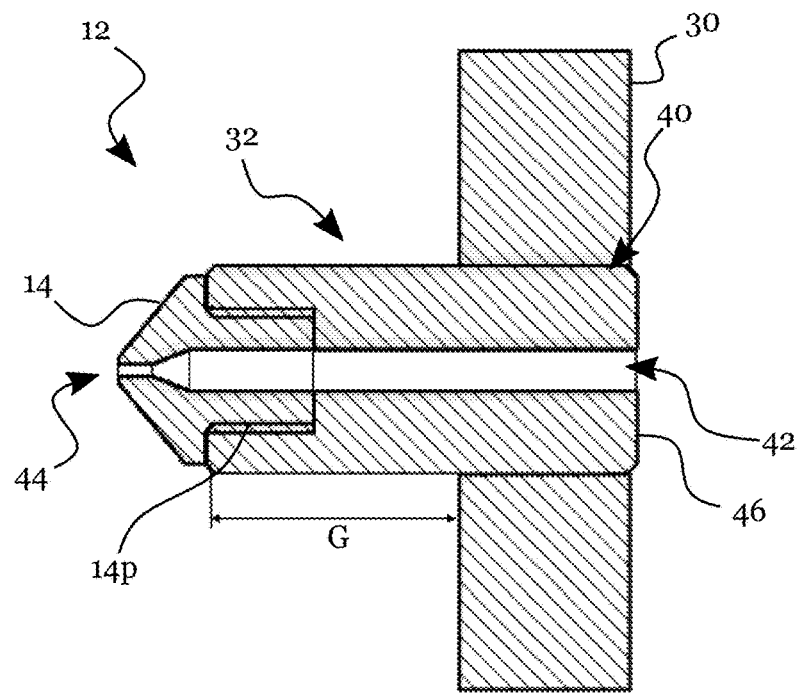
FIGS. 4A, 4B illustrate sectional views of schematic examples of print-heads with insulating spacers separating a nozzle and a heater without and with a dielectric shielding portion, respectively.
Figure 4B:
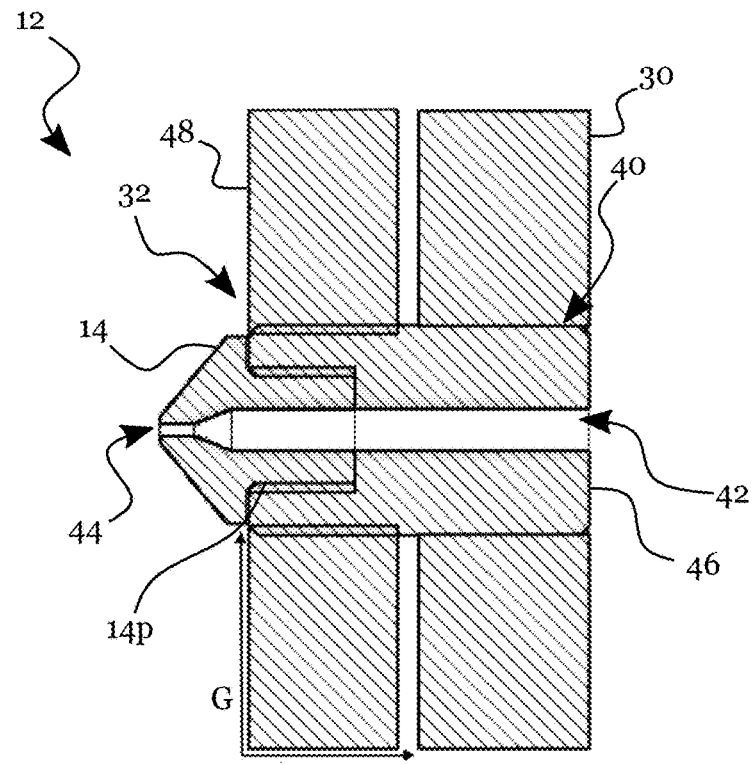

FIGS. 4A and 4B illustrate two sectional views of schematic examples of print-heads 12 with insulating spacers 32 separating a nozzle 14 and a heater 30. The insulating spacer 32 comprises an insulating spacer body 46 which protrudes through the heater 30 and surrounds a central passage 42 through the heater 30 and the insulating spacer 32 and towards a fluid path 44 in the nozzle 14. The nozzle 14 protrudes into an accommodating cavity in the insulating spacer body 46 with a protruding intake portion 14p and is mounted to the insulating spacer body 46 with external threads.

As illustrated in FIG. 4A, the heater 30 is mounted on the periphery of the insulating spacer body 46 and radially protrudes from the insulating spacer body 46. Accordingly, an arc gap G through air between the nozzle 14 and the heater 30 corresponds substantially to a straight line along the periphery of the insulating spacer body 46 between the nozzle 14 and the heater 30.

In FIG. 4B, the insulating spacer 32 comprises a central insulating spacer body 46 and a dielectric shielding portion 48. The dielectric shielding portion 48 is mounted on the insulating spacer body 46 between the heater 30 and the nozzle 14. A maximum radial extension of the dielectric shielding portion 48 corresponds substantially to a maximum radial extension of the heater 30. Accordingly, the effective arc gap G through air between the nozzle 14 and the heater 30 may curve around the dielectric shielding portion 48 and may be increased by a radial extension of the dielectric shielding portion 48 with respect to the example shown in FIG. 4A.

As a result of the increased effective arc gap, the distance between the nozzle 14 and the heater 30 may be reduced in the example of FIG. 4B (with respect to the example shown in FIG. 4A) without increasing a risk of arcing between the nozzle 14 and the heater 30.

A reduced distance between the nozzle 14 and to heater 30 may result in an improved heat transfer between the heater 30 and the nozzle 14 through the insulating spacer 32, such that a liquid phase of the polymer melt in the nozzle 14 may be maintained with the heater 30.

As a heat transfer from the heater 30 to the nozzle 14 may be substantially provided through the insulating spacer body 46, the dielectric shielding portion 48 may be made of a different material than the material of the insulating spacer body 46, in particular of a material having a lower thermal conductivity. If the material of the dielectric shielding portion 48 has a lower thermal conductivity than the material of the insulating spacer body 46, thermal losses at the radially extending shielding portion 48 will be reduced. At the same time, the maximum service temperature of the material of the dielectric shielding portion 48 and the material of the insulating spacer body 46 should be above about 200° C., or may be above 300° C. or 400° C.

Both the insulating spacer body 46 and the dielectric shielding portion 48 should be made of a material featuring a comparatively high dielectric strength, such as a dielectric strength larger than 10 kV/mm or larger than 20 kV/mm, preferably larger than 50 kV/mm, such as to prevent arcing through the insulating spacer body 46 and the dielectric shielding portion 48.

Further, the relative dielectric constant of the material of the insulating spacer body 46 and the dielectric shielding portion 48 should be at least 3, preferably at least 4, such as to attenuate electric fields between the heater 30 and the nozzle 14.

The insulating spacer body 46 and the dielectric shielding portion 48 may be joined to each other with an electrically insulating adhesive, such as an insulating cement, to prevent arcing through the joint of the insulating spacer body 46 and the dielectric shielding portion 48. The insulating cement joining the insulating spacer body 46 and the dielectric shielding portion 48 should have a similar thermal expansion coefficient than the insulating spacer body 46 and the dielectric shielding portion 48, and should equally have a maximum service temperature above about 200° C., above 300° C. or above 400° C. In some embodiments, the insulating spacer body 46 and the dielectric shielding portion 48 are joined to each other via a threaded joint, wherein the joint may be filled with the insulating cement.

However, in some embodiments, the insulating spacer body 46 and the dielectric shielding portion 48 are provided as a monolithic piece.

Figure 5:
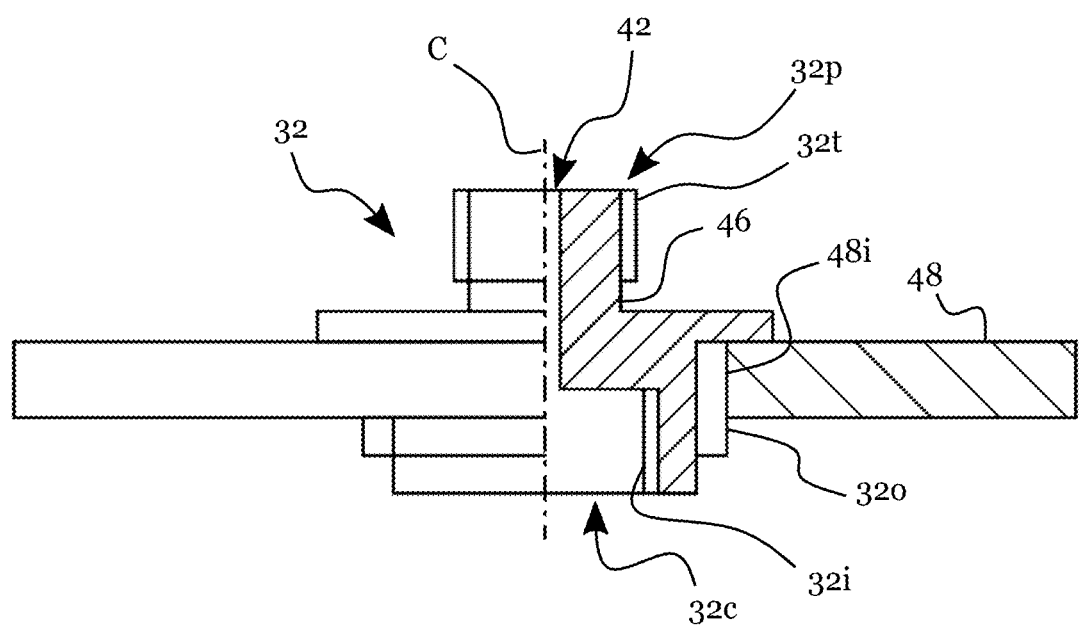
FIG. 5 illustrates a detail view of a schematic example of an insulating spacer comprising an insulating spacer body and a dielectric shielding portion.

FIG. 5 illustrates a detail view of a schematic example of an insulating spacer 32 comprising an insulating spacer body 46 and a dielectric shielding portion 48, wherein a left side of the illustrated insulating spacer 32 shows a side view of the insulating spacer 32 and the right side illustrate a sectional view through a central passage 42 of the insulating spacer 32.

The insulating spacer body 46 surrounds the central passage 42 for receiving solid polymer base material 24/polymer melt and guiding polymer melt towards the nozzle 14. On a first side, the insulating spacer 32 comprises an accommodating cavity 32c for receiving the nozzle 14 (not shown), wherein the accommodating cavity 32c comprises internal threads 32i to engage with external threads 14t of the nozzle 14. The accommodating cavity 32c may be centered with respect to a central axis C of the insulating spacer 32 and may be aligned with a central passage 42 of the insulating spacer 32, such that the central passage 42 aligns with a central fluid path 44 of a nozzle 14 mounted in the accommodating cavity 32c. On a second/opposite side, the insulating spacer 32 comprises a protruding portion 32p with external threads 32t to protrude into and engage with internal threads of a heater 30 (not shown).

In a central section of the insulating spacer 32, the insulating spacer body 46 is provided with outer external threats 32o engaging with internal threads 48i of the dielectric shielding portion 48 mounted in said central section onto the outer perimeter of the insulating spacer body 46 and protruding from the insulating spacer body 46 along a radial direction. The threaded joint of the insulating spacer body 46 and the dielectric shielding portion 48 may increase an effective length of an arcing gap through the composite insulating spacer 32. In addition, the threaded joint of the insulating spacer body 46 and the dielectric shielding portion 48 may be filled with an insulating cement to further prevent arcing through the joint. The insulating cement may be a high-temperature resistant, insulating ceramic adhesive, such as to join a ceramic insulating spacer body 46 and a ceramic dielectric shielding portion 48 made of different materials.

As illustrated in FIG. 5, a maximum radial extension of the dielectric shielding portion 48 may be larger than a maximum radial extension of the insulating spacer body 46 by at least 50% or by at least 100% to attenuate electric field lines between the nozzle 14 and the heater 30 along the periphery of the insulating spacer body 46, such as to prevent arcing between the nozzle 14 and the heater 30 and/or to prevent distortion of the flow of the polymer material 18 between the nozzle 14 and a collector 16 due to electric fields between the heater 30 and the nozzle 14. The insulating spacer 32 may therefore be interposed between a nozzle 14 and a heater 30 of a print-head 12 to enable electro-writing of predetermined structures with a polymer melt with a charged nozzle 14.

In some embodiments, the insulating spacer 32 electrically insulates the heater 30 and the polymer melt. For example, the heater 30 may be mounted to an outer face of the insulating spacer 32 and may not contact the polymer melt with a conductive element, while the solid polymer base material 24 may be heated through the insulating spacer 32. In some embodiments, an insulating feeding tube is joined to the insulating spacer 32, such as to feed the polymer base material 24 towards the central passage 42 of the insulating spacer 32 along a feeding path which is electrically insulated from the heater 30.

Figure 6:
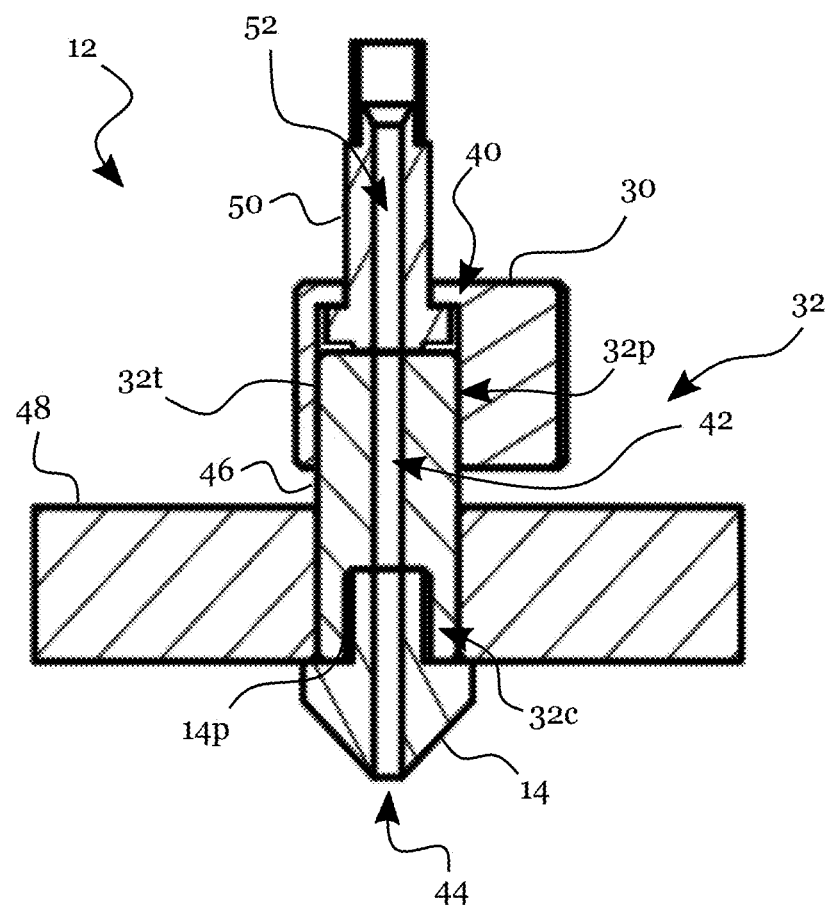
FIG. 6 illustrates a sectional view through a schematic print-head comprising a nozzle and a heater separated by an insulating spacer according to an example.

FIG. 6 illustrates a sectional view through a schematic print-head 12 comprising a nozzle 14 and a heater 30 separated by an insulating spacer 32 according to an example. The insulating spacer 32 comprises an insulating spacer body 46 and a dielectric shielding portion 48 protruding in a radial direction away from the insulating spacer body 46 to spatially screen the nozzle 14 and the heater 30 along the periphery of the insulating spacer body 46.

The insulating spacer 32 accommodates the nozzle 14 in an accommodating cavity 32c on a first side of the insulating spacer body 46 and protrudes into the heater 30 with a second/opposite side of the insulating spacer body 46.

A feeding tube 50 surrounding a feeding passage 52 is joined to the second side of the insulating spacer body 46, such that the feeding passage 52 aligns with the central passage 32 of the insulating spacer body 46, e.g. for feeding a polymer filament 28 (not shown) through the feeding passage 52 and into the central passage 42 of the insulating spacer body 46. The feeding tube 50 may be joined to the insulating spacer body 46 with an insulating cement, such as to form a continuous fluid path for the solid polymer base material 24/polymer melt through the feeding tube 50 and the insulating spacer body 46.

As illustrated in FIG. 6, the feeding tube 50 may protrude into the heater 30 such that a joint between the insulating spacer body 46 and the feeding tube 50 may lie within a central passage 40 of the heater 30. Hence, solid polymer base material 24 may be fed through the feeding passage 52 into a central passage 40 in the heater 30 and may be heated through the insulating spacer body 46 and the feeding tube 50, e.g. to be melted in the central passage 42 of the insulating spacer body 46.

Preferably, the feeding tube 50 has a lower thermal conductivity than the insulating spacer body 46, such that the heat generated by the heater 30 is conducted towards the nozzle 14 through the insulating spacer body 46, and the solid polymer base material 24, e.g. a polymer filament 28 fed through the feeding tube 50, may be substantially solid in the feeding tube 50 and may form a polymer melt in the central passage 42 of the insulating spacer body 46. Accordingly, the solid polymer base material 24 may be heated on demand in the central passage 40 surrounded by the heater 30, such as to prevent degradation of biodegradable polymer material 18 due to prolonged heat exposure in the print-head 12. In other words, the polymer melt may be created substantially in the central passage 42 of the insulating spacer body 46, and the polymer melt may be pushed out from the nozzle 14 by advancing solid polymer base material 24 fed through the feeding tube into the central passage 40 of the heater 30.

For example, the insulating spacer body 46 may be made of a ceramic material with a high thermal conductivity, such as an alumina based or an aluminum nitride based ceramic material, and the feeding tube 50 may be joined to the insulating spacer body 46 with a ceramic material portion featuring a lower thermal conductivity, such as a silicon oxide or silicon nitride based ceramic material.

Preferably, the feeding tube 50 and the insulating spacer body 46 feature similar thermal expansion coefficients to prevent mechanical strain when the heater 30 heats the solid polymer base material 24 beyond its melting point through the insulating spacer body 46 and/or the feeding tube 50. Similarly, the feeding tube 50 and the insulating spacer body 46 may be joined with a high-temperature resistant, insulating cement having a similar thermal expansion coefficient.

As an example, the insulating spacer body 46 may be made of the aluminum nitride based ceramic material known under the trademark name of "Shapal" and the feeding tube 50 may be made of the silicon oxide based ceramic material known under the trademark name of "Macor" and may be bonded with a ceramic adhesive, e.g. a ceramic adhesive based on alumina or magnesium phosphate with a similar thermal expansion.

Accordingly, heat generated by the heater 30 may be conducted to the solid polymer base material 24/polymer melt mainly through the insulating spacer body 46, such as to limit a liquid phase of the polymer base material 24 to the central passage 40 surrounded by the heater 30 and/or to the central passage 42 of the insulating spacer body 46. The feeding path through the print-head 12 may accordingly be considered to comprise different sections, wherein the solid polymer base material 24 is phase separated in the print-head 12 between the different sections and may be dynamically melted to create the polymer melt. The polymer melt may be advanced towards the nozzle 14 from one section to another by actuating the feeding mechanism 36 to push the polymer melt with the solid polymer base material 24.

In some embodiments, the phase transition from the solid polymer base material 24 towards the polymer melt may take place at/in the heater 30, and may in particular substantially take place at the joint between the insulating spacer body 46 and the feeding tube 50.

The skilled person will appreciate that the feeding tube 50 may at least partially be heated by the heater 30 to a temperature above the melting point (of the polymer base material 24) despite having a lower thermal conductivity than the insulating spacer body 46, e.g. based on an elapsed time of driving the system 10 and/or when the feeding tube 50 protrudes into the heater 30. Further, heat may also be transferred from the heater 30 to the solid polymer base material 24 through the feeding tube 50, e.g. via infrared irradiation. At the same time, the solid polymer base material 24 may also only be progressively heated while passing through the print-head 12 and the temperature of the solid polymer base material 24 may only be increased beyond the melting point during the passage through the insulating spacer 32. Hence, depending on the operating parameters of the heater and/or the print-head geometry, solid polymer base material 24 fed into the feeding tube 50 by the feeding mechanism 36 may also be (partially) melted in the feeding tube 50 before entering the insulating spacer body 46, or may only be melted after passing the joint between the insulating spacer body 46 and the feeding tube 50 in some embodiments.

The polymer melt may be guided through the central passage 42 of the insulating spacer body 46 and through the fluid path 44 of the nozzle 14, to be ejected by the nozzle 14 towards a collector 16 when the nozzle 14 is held at an elevated electric potential via a voltage applied through a conductor 34 (not shown in FIG. 6). At the same time, arcing or electric field distortions due to a potential difference between conductive portions of the heater 30 and the nozzle 14 may be prevented by the insulating spacer 32 separating the nozzle 14 and the heater 30. In particular, a radially extending dielectric shielding portion 48 of the insulating spacer 32 may prevent arcing along the periphery of the nozzle-heater combination in the print-head 12.

Accordingly, the polymer melt generated in the print-head 12 may be deposited on the collector 16 as polymer fibers 18, 20 in pre-determined locations on the collector 16 with a continuously fed supply of solid polymer base material 24.

FIG. 7 schematically illustrates a method for electro-writing of a polymer material 18 according to an example. The method comprises insulating a nozzle 14 and a heater 30 with an insulating spacer 32, wherein the insulating spacer 32 is at least partially surrounded by the heater 30 (S10). The method further comprises selectively feeding solid polymer base material 24 towards the heater 30 (S12), and heating the solid polymer base material 24 beyond its melting point with the heater 30 to generate the polymer melt (S14). The method further comprises applying an electric potential to the nozzle 14 (S16), and ejecting the polymer melt via the nozzle 14 (S18).

Insulating the nozzle 14 and the heater 30 with the insulating spacer 32 may comprise mounting an insulating spacer body 46 in the heater 30, in particular by engaging external threads 32t of the insulating spacer body 46 with internal threads in a cavity of the heater 30. Insulating the nozzle 14 and the heater 30 with the insulating spacer 32 may further comprise mounting the nozzle 14 in an accommodating cavity 32c of the insulating spacer body 46, in particular by engaging external threads 14t of the nozzle 14 with internal threads 32i in the accommodating cavity 32c of the insulating spacer body 32.

The skilled person will appreciate that the material options for the insulating spacer 32 as well as the techniques for joining different components of the print-head 12 disclosed above are merely examples and that a plurality of different materials and joining techniques may be alternatively used. Further, the system 10 and disclosed techniques may also be advantageously employed for electro-spraying techniques, wherein a sequence of charged polymer droplets is directed from the print-head 12 towards the collector 16, in addition to the electrospinning-writing techniques exemplarily discussed above.

The system 10 and the associated print-head 12 may also be suitable for depositing polymer material 18 in a fused deposition modeling mode, such as for forming a composite part based on the solid polymer base material 24 by selectively switching between depositing solid polymer structures in the fused deposition modeling mode and depositing electro-written polymer fibers 20 in an electro-writing mode.

In the fused deposition modeling mode, the polymer melt 18 may be selectively deposited to form a solid polymer structure on the collector 16, while a voltage between the nozzle 14 and the collector 16 may be below a threshold for electro-writing of the polymer melt 18, e.g. both the nozzle 14 and the collector 16 may be (electrically) grounded.

In the electro-writing mode, the voltage between the nozzle 14 and the collector 16 may be increased above a threshold for electro-writing of the polymer melt 18, and the polymer melt may be selectively deposited to form electro-written polymer fibers 20 over the collector 16 and/or the solid polymer structure along pre-determined deposition lines.

FIGS. 8A-8C illustrate examples of composite polymer structures 54 with different geometries.

FIG. 8A illustrates a composite polymer structure 54 in the form of an interbody fusion cage implant, sometimes also referred to as a spinal cage, according to an example. The composite polymer structure 54 comprises a solid polymer structure 56 defining an outer perimeter of the spinal cage and comprising an inner volume. The composite polymer structure 54 further comprises an electro-written polymer material stack 58 filling the inner volume of the solid polymer structure 56 with an ordered mesh of deposited polymer fibers 20.

The solid polymer structure 56 may be made of polymer material deposited in a fused deposition modeling mode with a print-head 12, such as the print-head 12 of the previous examples, without the application of an electric field between a nozzle 14 of the print-head 12 and the collector 16 (print-head 12 and collector 16 not shown in FIGS. 8A-8C).

Polymer material deposited in the fused deposition modeling mode may be formed of beads or fibers having a diameter on the order of a diameter of the nozzle 14 and may feature a porosity smaller than 50%, in particular smaller than 25% or smaller than 15%. The solid polymer structure 56 may feature a greater mechanical strength than the electro-written polymer material stack 58. Although the solid polymer structure 56 is shown as enclosing an inner volume in FIG. 8A, the skilled person will appreciate that the inner volume may be partially open, e.g. the solid polymer structure 56 may only partially surround the inner volume.

The electro-written polymer material stack 58 may be deposited onto the collector 16 and/or the polymer structure 56 along pre-determined deposition lines in an electro-writing mode, wherein a voltage between the nozzle 14 and the collector 16 is above a threshold for electro-writing of the polymer melt to deposit electro-written polymer fibers 20 with a pre-determined orientation.

The diameter of the melt electro-written polymer fibers 20 in the electro-written polymer material stack 58 may be smaller than the diameter of polymer fibers/beads in the solid polymer structure 56, such as less than half the diameter of polymer fibers/beads in the solid polymer structure 56. For example, the deposited melt electro-written polymer fibers 20 may have a diameter which is smaller than the diameter of the nozzle 14 of the print-head 12 due to a tapering 22 of the polymer material 18 at a nozzle exit of the nozzle 14, such as a diameter smaller than 50 μm.

The melt electro-written polymer fibers 20 deposited in the electro-writing mode may be arranged in an ordered mesh to form the electro-written polymer material stack 58. The resulting electro-written polymer material stack 58 may be porous, e.g. a porosity of the electro-written polymer material stack 58 may be larger than 25%, in particular larger than 40% or larger than 50%. Preferably, the structure of the electro-written polymer material stack 58 is adapted to enable cell growth on or through the electro-written polymer material stack 58. The electro-written polymer material stack 58 may be functionalized to enhance the biocompatibility of the composite polymer structure 54 and/or may be combined with a bone-growth promoting material, such as beta-tricalcium phosphate or bone material.

To form the composite polymer structure 54, the same print-head 12 may be switched between the fused deposition modeling mode and the electro-writing mode, e.g. after forming a pre-determined number of layers of the solid polymer structure 56, to alternatingly deposit layers of the solid polymer structure 56 and of the electro-written polymer material stack 58. In some embodiments, the print-head 12 is switched from the fused deposition modeling mode to the electro-writing mode after the solid polymer structure 56 has been fully deposited.

The layers of the solid polymer structure 56 and of the electro-written polymer material stack 58 may be formed from the same solid polymer base material 24, such as a common polymer filament 28 fed towards the nozzle 14, and the fused deposition modeling mode and the electro-writing mode may differ by a voltage value applied between the nozzle 14 and the collector 16 and by a feeding rate of the polymer filament 28.

Accordingly, the composite polymer structure 54 may be formed with different material portions having different physical characteristics based on the same solid polymer base material 24, e.g. the same polymer filament 28.

FIG. 8B illustrates another example of a composite polymer structure 54. The composite polymer structure 54 comprises a body of a solid polymer structure 56 and a coating of an electro-written polymer material stack 58. The solid polymer structure 56 may be formed in the fused deposition modeling mode discussed in the context of FIG. 8A and the solid polymer structure 56 may subsequently be coated with the electro-written polymer material stack 58 in the electro-writing mode, e.g. based on the same solid polymer base material 24.

While FIG. 8B illustrates a square solid polymer structure 56, the skilled person will appreciate that arbitrary shapes may be constructed in the fused deposition modeling mode and may subsequently or alternatingly be coated with an electro-written polymer material stack 58 in the electro-writing mode, and the example of FIG. 8B should therefore be seen as illustrative. For example, layers of the solid polymer structure 56 and the electro-written polymer material stack 58 may be stacked alternatingly along the build direction, e.g. perpendicular to the surface of the collector 16 (not shown).

FIG. 8C illustrates another example of a composite polymer structure 54. The composite polymer structure 54 comprises a scaffold of a solid polymer structure 56 surrounding a square opening filled with an electro-written polymer material stack 58. The electro-written polymer material stack 58 may comprise a regular mesh of deposited electro-written polymer fibers 20, wherein a geometry of the electro-written polymer material stack 58 may be configured to filter target material going through the opening in the solid polymer structure 56.

For example, the composite polymer structure 54 may be configured as a filter, wherein target material is filtered during a passage through the electro-written polymer material stack 58 in the opening, e.g. by using functionalized polymer fibers 20, while the solid polymer structure 56 may comprise mounting elements configured to enable mounting of the composite polymer structure 54.

The description of the preferred embodiments and the figures merely serve to illustrate the invention and the beneficial effects associated therewith, but should not be understood to imply any limitation. The scope of the invention is to be determined solely by the appended claims.

LIST OF REFERENCE SIGNS 10 system
12 print-head
14 nozzle
16 collector (plate)
18 polymer material
20 received polymer material
22 tapering/Taylor cone
24 polymer base material
26 piston
28 polymer filament
30 heater
32 insulating spacer
34 conductor
36 feed mechanism
38 frictional wheels
40 central passage in the heater
42 central passage in the insulating spacer
44 fluid path in the nozzle
46 insulating spacer body
48 dielectric shielding portion
50 feeding tube
52 feeding passage
54 composite polymer structure
56 solid polymer structure
58 electro-written polymer material stack
G arc gap
C central axis
E electric field

What is claimed is:

1. A system for electro-writing of a polymer melt, the system comprising a print-head and a feed mechanism configured to controllably feed solid polymer base material towards the print-head, wherein the print-head comprises a nozzle component, a heater component and an insulating spacer component,
   wherein the print-head is configured to eject the polymer melt via the nozzle, wherein the nozzle is configured to be held at a selectable electric potential;
   wherein the heater is arranged in the print-head and proximate the nozzle, and wherein the heater is configured to heat the solid polymer base material beyond its melting point to create the polymer melt in the print-head;
   wherein the insulating spacer is arranged between the heater and the nozzle, wherein the insulating spacer electrically insulates the heater and the nozzle, and wherein the insulating spacer is at least partially surrounded by the heater and protrudes into said heater; and
   wherein the insulating spacer at least partially surrounds the nozzle.

2. The system of claim 1, wherein the insulating spacer comprises external threads, wherein the heater comprises internal threads, and wherein the external threads of the insulating spacer engage with the internal threads of the heater.

3. The system of claim 1,
wherein the insulating spacer comprises internal threads, wherein the nozzle comprises external threads, and wherein the internal threads of the insulating spacer engage with the external threads of the nozzle.

4. The system of claim 1, wherein the insulating spacer and the heater are cast into an integral piece with an adhesive.

5. The system of claim 1, wherein the insulating spacer comprises an insulating spacer body extending between the nozzle and the heater and protruding into the heater, wherein the insulating spacer body comprises a central passage for guiding the polymer melt from the heater towards the nozzle.

6. The system of claim 1, wherein the solid polymer base material is a polymer filament which is advanced by the feed mechanism towards the nozzle.

7. The system of claim 1, wherein the system further comprises a grounded collector facing the print-head for receiving the polymer melt.

8. The system of claim 1, further comprising a control system for controlling the feed mechanism and the print-head, wherein the control system is configured to select one of a plurality of driving modes, the plurality of driving modes comprising at least an electro-writing mode and a fused deposition modeling mode.

9. The system of claim 5, wherein the heater is arranged at least partially around the insulating spacer body to heat solid polymer base material through the insulating spacer body.

10. The system of claim 5, wherein the thermal conductivity of the insulating spacer body is larger than 1 W/K*.

11. The system of claim 5, wherein the insulating spacer body is made of a ceramic spacer material.

12. The system of claim 5, wherein the insulating spacer comprises a dielectric shielding portion which radially protrudes from the insulating spacer body to attenuate electric fields between the heater and the nozzle.

13. The system of claim 5, wherein the insulating spacer body extends from the nozzle to an insulating feed tube, wherein a thermal conductivity of the feed tube is smaller than a thermal conductivity of the insulating spacer body.

14. The system of claim 12, wherein the dielectric shielding portion spatially screens the heater and the nozzle.

15. The system of claim 12, wherein a radial extension of the dielectric shielding portion with respect to the central passage is larger than a radial extension of the heater.

16. The system of claim 12, wherein the dielectric shielding portion and the insulating spacer body are made of different materials.

17. The system of claim 7, wherein a distance between the collector and the nozzle is smaller than 10 mm, when electro-writing with the polymer melt onto the collector.

* * * * *